United States Patent
Hannuksela

(10) Patent No.: US 11,838,521 B2
(45) Date of Patent: *Dec. 5, 2023

(54) METHOD AND APPARATUS FOR TILE-RELATIVE ADDRESSING IN VIDEO CODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 83 days.

This patent is subject to a terminal disclaimer.

(21) Appl. No.: 17/590,254

(22) Filed: Feb. 1, 2022

(65) Prior Publication Data

US 2022/0159275 A1 May 19, 2022

Related U.S. Application Data

(63) Continuation of application No. 17/255,593, filed as application No. PCT/FI2019/050469 on Jun. 18, 2019, now Pat. No. 11,290,728.

(Continued)

(51) Int. Cl.
*H04N 19/174* (2014.01)
*H04N 19/172* (2014.01)
(Continued)

(52) U.S. Cl.
CPC ......... *H04N 19/174* (2014.11); *H04N 19/172* (2014.11); *H04N 19/176* (2014.11);
(Continued)

(58) Field of Classification Search
CPC .. H04N 19/174; H04N 19/172; H04N 19/176; H04N 19/513; H04N 19/70;
(Continued)

(56) References Cited

U.S. PATENT DOCUMENTS

2003/0112867 A1* 6/2003 Hannuksela ........... H04N 19/29
375/240
2007/0183676 A1* 8/2007 Hannuksela ........... H04N 19/17
375/E7.182

(Continued)

FOREIGN PATENT DOCUMENTS

CA 2842804 A1 * 2/2013 ........... H04N 19/129
CN 105325003 A 2/2016

(Continued)

OTHER PUBLICATIONS

Kiran Misra et al. "An Overview of Tiles in HEVC" IEEE Journal of Selected Topics in Signal Processing, vol. 7., No. 6, Dec. 1, 2013, pp. 969-977, XP055257475.

(Continued)

*Primary Examiner* — Robert J Hance
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to: receive a picture; encode the picture as one or more slices; and encode, into a slice header of a slice of the one or more slices, a subpicture identifier indicative of a subpicture that comprises the slice; wherein the subpicture identifier is indicative of a subpicture position for the subpicture comprising the slice, the subpicture identifier being among one or more subpicture identifiers indicative of one or more subpicture positions for one or more subpictures comprising one or more slices.

16 Claims, 7 Drawing Sheets

Related U.S. Application Data

(60) Provisional application No. 62/693,118, filed on Jul. 2, 2018.

(51) Int. Cl.
*H04N 19/176* (2014.01)
*H04N 19/513* (2014.01)
*H04N 19/70* (2014.01)
*H04N 19/597* (2014.01)

(52) U.S. Cl.
CPC ........... *H04N 19/513* (2014.11); *H04N 19/70* (2014.11); *H04N 19/597* (2014.11)

(58) Field of Classification Search
CPC .... H04N 19/597; H04N 19/44; H04N 19/134; H04N 19/46
See application file for complete search history.

(56) References Cited

U.S. PATENT DOCUMENTS

| | | | |
|---|---|---|---|
| 2012/0230428 A1* | 9/2012 | Segall | H04N 19/129 375/240.25 |
| 2013/0016771 A1* | 1/2013 | Misra | H04N 19/13 375/240.03 |
| 2013/0101035 A1 | 4/2013 | Wang et al. | 375/240.12 |
| 2015/0016503 A1 | 1/2015 | Rapaka | |
| 2015/0117538 A1* | 4/2015 | Sjoberg | H04N 19/52 375/240.16 |
| 2015/0208095 A1* | 7/2015 | Schierl | H04N 19/423 375/240.28 |
| 2015/0304673 A1* | 10/2015 | Araki | H04N 19/44 382/233 |
| 2015/0350659 A1 | 12/2015 | Auyeung et al. | |
| 2016/0014480 A1 | 1/2016 | Maze | |
| 2017/0094269 A1 | 3/2017 | Ye et al. | 19/105 |
| 2017/0201757 A1* | 7/2017 | Goldman | H04L 65/762 |
| 2017/0289556 A1* | 10/2017 | Hendry | H04N 19/30 |
| 2018/0255317 A1* | 9/2018 | Wang | H04N 19/55 |
| 2020/0351497 A1* | 11/2020 | Skupin | H04N 19/48 |

FOREIGN PATENT DOCUMENTS

| | | | | |
|---|---|---|---|---|
| CN | 105432082 A | | 3/2016 | |
| EP | 2842318 B1 * | | 12/2016 | ............ H04N 17/00 |
| EP | 2842318 B1 | | 12/2016 | |
| JP | 2015526006 A | | 9/2015 | |
| RU | 2537803 C2 | | 1/2015 | |
| RU | 2575397 C2 | | 2/2016 | |
| WO | WO-2012060459 A1 * | | 5/2012 | ....... H04N 19/00903 |
| WO | WO-2012060459 A1 | | 5/2012 | |
| WO | WO-2013008942 A1 * | | 1/2013 | ........... H04N 19/105 |
| WO | WO-2013008942 A1 | | 1/2013 | |
| WO | WO-2013150943 A1 | | 10/2013 | |
| WO | WO-2015/197815 A1 | | 12/2015 | |
| WO | WO-2016051127 A1 * | | 4/2016 | ........... H04L 65/602 |
| WO | WO-2016051127 A1 | | 4/2016 | |
| WO | WO-2018123608 A1 * | | 7/2018 | ............ H04N 19/40 |
| WO | WO-2018123608 A1 | | 7/2018 | |
| WO | WO-2019/073112 A1 | | 4/2019 | |
| WO | WO-2020008103 A1 | | 1/2020 | |

OTHER PUBLICATIONS

Hendry et al. "AHG4: Harmonized Method for Signalling Entry Points of Tiles and WPP Substreams", 8. JCT-VC Meeting; Feb. 1, 2012-Feb. 10, 2012; San Jose; (Joint Collaborative Team on Video Coding of ISO/IEC JTC1/SC29/WG11 and ITU-T SG.16) No. JCTVC-H0556 Feb. 10, 2012 (Feb. 10, 2012), XP030232879, retrieved from the internet: URL: http://phenix.int-evry.fr/jct/doc_end_user/documents/8_San%20Jose/wg11/JCTVC-H0556-v3.zip_JCTVC-H0556_r1.docx [retrieved on Feb. 10, 2012].

Segall (Sharplabs) A et al. "Harmonization of Entry Points for Tiles and Wavefront Processing", 7. JCT-VC Meeting; Nov. 21, 2011-Nov. 30, 2011; Geneva; (Joint Collaborative on Video Coding of ISO/IEC JTC1/SC29/WG11 and ITU-T SG Team 16), No. JCTVC-G722 Nov. 24, 2011, XP030230950, Retrieved from the Internet: URL:http://phenix.int-evry.fr/jct/doc_end_user/documents/7_Geneva/wg11/JCTVC-G722-v2.zip_JCTVC-G722-r1.doc [retrieved on Nov. 24, 2011.

"Advanced Video Coding for Generic Audiovisual services", Series H: Audiovisual and Multimedia Systems, Infrastructure of audio-visual services—Coding of moving Video, Recommendation ITU-T H.264, Jun. 2019, 836 pages.

"High Efficiency Video Coding", Series H: Audiovisual and Multimedia Systems, Infrastructure of audiovisual services—Coding of moving video, Recommendation ITU-T H.265, Nov. 2019, 712 pages.

"Versatile Video Coding", Series H: Audiovisual and Multimedia Systems, Infrastructure of audiovisual services—Coding of moving video, Recommendation ITU-T H.266, Aug. 2020, 516 pages.

"Information Technology—Coding of Audio-Visual Objects—Part 12: ISO Base Media File Format", ISO/IEC 14496-12 Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

Information Technology—Coding of Audio-Visual Objects—Part 15: Advanced Video Coding (AVC) File Format, ISO/EC 14496-15, Second edition, Jun. 1, 2010, 96 pages.

"3rd Generation Partnership Project; Technical Specification Group Services and System Aspects; Transparent end-to-end packet switched streaming service (PSS); 3GPP file format (3GP)(Release 15)", 3GPP TS 26.244, V15.0.0, Jun. 2018, pp. 1-67.

International Search Report and Written Opinion received for corresponding Patent Cooperation Treaty Application No. PCT/FI2019/050469, dated Nov. 11, 2019, 17 pages.

Misra et al., "An Overview of Tiles in HEVC", IEEE Journal of Selected Topics in Signal Processing, vol. 7, No. 6, Dec. 2013, pp. 969-977.

Hsu et al., "AHG4: Low latency CABAC initialization for dependent tiles", Joint Collaborative Team on Video Coding (JCT-VC) of ITU-T SG16 WP3 and ISO/IEC JTC1/SC29/WG11, JCTVC-G0197, 7th Meeting, Nov. 21-30, 2011, pp. 1-8.

Esenlik et al., "AHG9: On Dependent Slices Syntax", Joint Collaborative team on Video Coding (JCT-VC) of ITU-T SG 16 WP 3 and ISO/IEC JTC 1/SC 29/WG 11, JCTVC-K0184, 11th Meeting, Oct. 10-19, 2012, pp. 1-8.

\* cited by examiner

METHOD AND APPARATUS FOR TILE-RELATIVE ADDRESSING IN VIDEO CODING

RELATED APPLICATION

This application is a continuation of U.S. patent application Ser. No. 17/255,593, filed Dec. 23, 2020, which is incorporated herein by reference in its entirety, which is a National Stage Entry of International Application No. PCT/FI2019/050469, filed Jun. 18, 2019, which is incorporated herein by reference in its entirety, which claims priority to U.S. Provisional Patent Application No. 62/693,118, filed Jul. 2, 2018, which is incorporated herein by reference in its entirety.

TECHNICAL FIELD

An example embodiment relates generally to video encoding and decoding.

BACKGROUND

In some video codecs, such as a High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the CU. A CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with the CU. Each PU and TU can be further split into smaller PUs and TUs in order to increase granularity of the prediction and prediction error coding processes, respectively. Each PU has prediction information associated with the PU defining the kind of prediction that is to be applied for the pixels within the PU (e.g., motion vector information for inter predicted PUs and intra prediction directionality information for intra predicted PUs).

A slice is an integer number of CTUs contained in one independent slice segment and all subsequent dependent slice segments (if any) that precede the next independent slice segment (if any) within the same access unit. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. The position of a slice within a picture is indicated through block indexing in raster scan order within a picture.

Because the position of a slice within a picture is indicated through block indexing in raster scan order within a picture, repositioning of a slice or extracting a subset of tiles or slices (other than picture-wide subsets starting from the top-left corner of the picture) requires rewriting of slice header(s). Repositioning of slices happens in various different situations, such as when extracting a tile set to its own bitstream, viewport switching with a different tile order or picture size in decoded pictures than in encoded pictures for 360-degree videos, and the like. Rewriting slice headers for the purpose of repositioning a slice is inefficient as slice header rewriting affects the bitrate of the stream and/or requires special rewriting instructions, all of which causes additional computational time and resources to be utilized.

BRIEF SUMMARY

In some embodiments, a method, apparatus and computer program product are provided in accordance with an example embodiment in order to encode a picture into a coded picture. In one example embodiment, a method is provided that includes receiving a picture. The method further includes encoding the picture as one or more slices. The method further includes encoding, into a slice header of a slice of the one or more slices, one or more tile identifiers indicative of one or more tile positions for one or more tiles in the slice. The method further includes encoding one or more assignments of one or more tile identifier values for the one or more tile identifiers indicative of tile positions in a parameter set file.

In some implementations of such a method, the method further includes, encoding, into the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the method further includes constructing one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the method further includes constructing a decoding order constraint file associated with the picture. The decoding order constraint file includes a reorder indication indicating whether the one or more tiles are able to be reordered without affecting decodability for the one or more tiles.

In another example embodiment, an apparatus is provided that includes at least one processor and at least one memory including computer program code for one or more programs with the at least one memory and the computer program code configured to, with the at least one processor, cause the apparatus at least to receive a picture. The computer program code is further configured to, with the at least one processor, cause the apparatus to encode the picture as one or more slices. The computer program code is further configured to, with the at least one processor, cause the apparatus to encode, into a slice header of a slice of the one or more slices, one or more tile identifiers indicative of one or more tile positions for one or more tiles in the slice. The computer program code is further configured to, with the at least one processor, cause the apparatus to encode one or more assignments of one or more tile identifier values for the one or more tile identifiers indicative of tile positions in a parameter set file.

In some implementations of such an apparatus, the computer program code is further configured to, with the at least one processor, cause the apparatus to encode, into the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the computer program code is further configured to, with the at least one processor, cause the apparatus to construct one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the computer program code is further configured to, with the at least one processor, cause the apparatus to construct a decoding order constraint file associated with the picture. The decoding order constraint file includes a reorder indication indicating whether the one or more tiles are able to be reordered without affecting decodability for the one or more tiles.

In another example embodiment, an apparatus is provided that includes means for receiving a picture. The apparatus further includes means for encoding the picture as one or more slices. The apparatus further includes means for encoding, into a slice header of a slice of the one or more slices, one or more tile identifiers indicative of one or more tile positions for one or more tiles in the slice. The apparatus further includes means for encoding one or more assignments of one or more tile identifier values for the one or more tile identifiers indicative of tile positions in a parameter set file.

In some implementations of such an apparatus, the apparatus further includes means for, encoding, into the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the apparatus further includes means for constructing one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the apparatus further includes means for constructing a decoding order constraint file associated with the picture. The decoding order constraint file includes a reorder indication indicating whether the one or more tiles are able to be reordered without affecting decodability for the one or more tiles.

In yet another example embodiment, a computer program product is provided that includes at least one non-transitory computer-readable storage medium having computer executable program code instructions stored therein with the computer executable program code instructions comprising program code instructions configured, upon execution, to receive a picture. The computer executable program code instructions further include program code instructions configured, upon execution, to encode the picture as one or more slices. The computer executable program code instructions further include program code instructions configured, upon execution, to encode, into a slice header of a slice of the one or more slices, one or more tile identifiers indicative of one or more tile positions for one or more tiles in the slice. The computer executable program code instructions further include program code instructions configured, upon execution, to encode one or more assignments of one or more tile identifier values for the one or more tile identifiers indicative of tile positions in a parameter set file.

In some implementations of such a computer program product, the computer executable program code instructions further include program code instructions configured, upon execution, to encode, into the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the computer executable program code instructions further include program code instructions configured, upon execution, to construct one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the computer executable program code instructions further include program code instructions configured, upon execution, to construct a decoding order constraint file associated with the picture. The decoding order constraint file includes a reorder indication indicating whether the one or more tiles are able to be reordered without affecting decodability for the one or more tiles.

In some embodiments, a method, apparatus and computer program product are provided in accordance with an example embodiment in order to construct an in-picture-prediction-enabled (IPPE) tile set. In one example embodiment, a method is provided that includes receiving or encoding a bitstream comprising a coded picture, the coded picture comprising one or more tiles. The method further includes identifying one or more dependent tiles from the one or more tiles. The one or more dependent tiles are dependent on another dependent tile within a coded picture or form a logical atomic unit with another dependent tile. The method further includes constructing an indication of an in-picture-prediction-enabled tile set comprising the one or more dependent tiles. The method further includes causing storage of the bitstream and the indication of the in-picture-prediction-enabled tile set.

In some implementations of such a method, the method further includes encoding the indication of the in-picture-prediction-enabled tile set in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In another example embodiment, an apparatus is provided that includes at least one processor and at least one memory including computer program code for one or more programs with the at least one memory and the computer program code configured to, with the at least one processor, cause the apparatus at least to receive or encode a bitstream comprising a coded picture, the coded picture comprising one or more tiles. The computer program code is further configured to, with the at least one processor, cause the apparatus to identify one or more dependent tiles from the one or more tiles. The one or more dependent tiles are dependent on another dependent tile within a coded picture or form a logical atomic unit with another dependent tile. The computer program code is further configured to, with the at least one processor, cause the apparatus to construct an indication of an in-picture-prediction-enabled tile set comprising the one or more dependent tiles. The computer program code is further configured to, with the at least one processor, cause the apparatus to cause storage of the bitstream and the indication of the in-picture-prediction-enabled tile set.

In some implementations of such an apparatus, the computer program code is further configured to, with the at least one processor, cause the apparatus to encode the indication of the in-picture-prediction-enabled tile set in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In another example embodiment, an apparatus is provided that includes means for receiving or encoding a bitstream comprising a coded picture, the coded picture comprising one or more tiles. The apparatus further includes means for identifying one or more dependent tiles from the one or more tiles. The one or more dependent tiles are dependent on another dependent tile within a coded picture or form a logical atomic unit with another dependent tile. The apparatus further includes means for constructing an indication of an in-picture-prediction-enabled tile set comprising the one or more dependent tiles. The apparatus further includes means for causing storage of the bitstream and the indication of the in-picture-prediction-enabled tile set.

In some implementations of such an apparatus, the apparatus further includes means for encoding the indication of the in-picture-prediction-enabled tile set in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In yet another example embodiment, a computer program product is provided that includes at least one non-transitory computer-readable storage medium having computer executable program code instructions stored therein with the computer executable program code instructions comprising program code instructions configured, upon execution, to receive or encode a bitstream comprising a coded picture, the coded picture comprising one or more tiles. The computer executable program code instructions further include program code instructions configured, upon execution, to identify one or more dependent tiles from the one or more tiles. The one or more dependent tiles are dependent on another dependent tile within a coded picture or form a logical atomic unit with another dependent tile. The computer executable program code instructions further include program code instructions configured, upon execution, to construct an indication of an in-picture-prediction-enabled tile set comprising the one or more dependent tiles. The computer executable program code instructions further include program code instructions configured, upon execution, to cause storage of the bitstream and the indication of the in-picture-prediction-enabled tile set.

In some implementations of such a computer program product, the computer executable program code instructions further include program code instructions configured, upon execution, to encode the indication of the in-picture-prediction-enabled tile set in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In some embodiments, a method, apparatus and computer program product are provided in accordance with an example embodiment in order to decode a coded picture.

In one example embodiment, a method is provided that includes receiving a coded picture comprising one or more slices. The method further includes decoding, from a slice header of a slice of the one or more slices, one or more tile identifiers indicative of one or more tile positions for one or more tiles in the slice. The method further includes decoding slice data of the slice into a decoded picture starting from one or more tile positions for one or more tiles in the slice.

In some implementations of such a method, the method further includes, decoding, from the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the method further includes decoding one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the method further includes decoding one or more assignments of one or more tile identifier values for the one or more tile identifiers tile positions from a parameter set file. In some embodiments, the method further includes decoding the one or more tiles according to a decoding order constraint file associated with the picture.

The decoding order constraint file includes a reorder indication indicating whether the one or more tiles are able to be reordered without affecting decodability for the one or more tiles.

In another example embodiment, an apparatus is provided that includes at least one processor and at least one memory including computer program code for one or more programs with the at least one memory and the computer program code configured to, with the at least one processor, cause the apparatus at least to receive a coded picture comprising one or more slices. The computer program code is further configured to, with the at least one processor, cause the apparatus to decode, from a slice header of a slice of the one or more slices, one or more tile identifiers indicative of one or more tile positions for one or more tiles in the slice. The computer program code is further configured to, with the at least one processor, cause the apparatus to decode slice data of the slice into a decoded picture starting from one or more tile positions for one or more tiles in the slice.

In some implementations of such an apparatus, the computer program code is further configured to, with the at least one processor, cause the apparatus to decode, from the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, computer program code is further configured to, with the at least one processor, cause the apparatus to decode one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the computer program code is further configured to, with the at least one processor, cause the apparatus to decode one or more assignments of one or more tile identifier values for the one or more tile identifiers tile positions from a parameter set file. In some embodiments, the computer program code is further configured to, with the at least one processor, cause the apparatus to decode the one or more tiles according to a decoding order constraint file associated with the picture. The decoding order constraint file includes a reorder indication indicating whether the one or more tiles are able to be reordered without affecting decodability for the one or more tiles.

In another example embodiment, an apparatus is provided that includes means for receiving a coded picture comprising one or more slices. The apparatus further includes means for decoding, from a slice header of a slice of the one or more slices, one or more tile identifiers indicative of one or more tile positions for one or more tiles in the slice. The apparatus further includes means for decoding slice data of the slice into a decoded picture starting from one or more tile positions for one or more tiles in the slice.

In some implementations of such an apparatus, the apparatus further includes means for, decoding, from the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the apparatus further includes means for decoding one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the apparatus further includes means for decoding one or more assignments of one or more tile identifier values for the one or more tile identifiers tile positions from a parameter set file. In some embodiments, the apparatus further includes means for decoding the one or more tiles according to a decoding order constraint file associated with the picture. The decoding order constraint file includes a reorder indication indicating whether the one or more tiles are able to be reordered without affecting decodability for the one or more tiles.

In another example embodiment, a computer program product is provided that includes at least one non-transitory computer-readable storage medium having computer executable program code instructions stored therein with the computer executable program code instructions comprising program code instructions configured, upon execution, to receive a coded picture comprising one or more slices. The computer executable program code instructions further include program code instructions configured, upon execution, to decode, from a slice header of a slice of the one or more slices, one or more tile identifiers indicative of one or more tile positions for one or more tiles in the slice. The computer executable program code instructions further include program code instructions configured, upon execution, to decode slice data of the slice into a decoded picture starting from one or more tile positions for one or more tiles in the slice.

In some implementations of such a computer program product, the computer executable program code instructions further include program code instructions configured, upon execution, to decode, from the slice header, a block index relative to a tile of the one or more tiles. The block index comprises a syntax element indicative of a block position for a block within the tile. In some embodiments, one tile identifier of the one or more tile identifiers is indicative of a tile that comprises a pre-defined block of the slice. In some embodiments, the computer executable program code instructions further include program code instructions configured, upon execution, to decode one or more motion vectors associated with one or more prediction units in one or more coding units in the one or more tiles. The one or more motion vectors apply in one or more anchor locations derived from one or more anchor location identifiers defining a position relative to the one or more tiles indicated by the one or more tile identifiers. In some embodiments, the computer executable program code instructions further include program code instructions configured, upon execution, to decode one or more assignments of one or more tile identifier values for the one or more tile identifiers tile positions from a parameter set file. In some embodiments, the computer executable program code instructions further include program code instructions configured, upon execution, to decode the one or more tiles according to a decoding order constraint file associated with the picture. The decoding order constraint file includes a reorder indication indicating whether the one or more tiles are able to be reordered without affecting decodability for the one or more tiles.

In some embodiments, a method, apparatus and computer program product are provided in accordance with an example embodiment in order to decode an in-picture-prediction-enabled (IPPE) tile set. In one example embodiment, a method is provided that includes receiving a bitstream comprising a coded picture, the coded picture comprising one or more tiles. The method further includes receiving an indication of an in-picture-prediction-enabled tile set. The in-picture-prediction-enabled tile set identifies one or more dependent tiles from the one or more tiles. The one or more dependent tiles are dependent on another dependent tile within a coded picture or form a logical atomic unit with another dependent tile. The method further includes decoding the bitstream according to the indication of the in-picture-prediction-enabled tile set.

In some implementations of such a method, the indication of the in-picture-prediction-enabled tile set is encoded in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In another example embodiment, an apparatus is provided that includes at least one processor and at least one memory including computer program code for one or more programs with the at least one memory and the computer program code configured to, with the at least one processor, cause the apparatus at least to receive a bitstream comprising a coded picture, the coded picture comprising one or more tiles. The computer program code is configured to, with the at least one processor, cause the apparatus to receive an indication of an in-picture-prediction-enabled tile set. The in-picture-prediction-enabled tile set identifies one or more dependent tiles from the one or more tiles. The one or more dependent tiles are dependent on another dependent tile within a coded picture or form a logical atomic unit with another dependent tile. The computer program code is configured to, with the at least one processor, cause the apparatus to decode the bitstream according to the indication of the in-picture-prediction-enabled tile set.

In some implementations of such an apparatus, the indication of the in-picture-prediction-enabled tile set is encoded in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In another example embodiment, an apparatus is provided that includes means for receiving a bitstream comprising a coded picture, the coded picture comprising one or more tiles. The apparatus further includes means for receiving an indication of an in-picture-prediction-enabled tile set. The in-picture-prediction-enabled tile set identifies one or more dependent tiles from the one or more tiles. The one or more dependent tiles are dependent on another dependent tile within a coded picture or form a logical atomic unit with another dependent tile. The apparatus further includes means for decoding the bitstream according to the indication of the in-picture-prediction-enabled tile set.

In some implementations of such an apparatus, the indication of the in-picture-prediction-enabled tile set is encoded in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

In another example embodiment, a computer program product is provided that includes at least one non-transitory computer-readable storage medium having computer executable program code instructions stored therein with the computer executable program code instructions comprising program code instructions configured, upon execution, to receive a bitstream comprising a coded picture, the coded picture comprising one or more tiles. The computer executable program code instructions further include program code instructions configured, upon execution, to receive an indication of an in-picture-prediction-enabled tile set. The in-picture-prediction-enabled tile set identifies one or more dependent tiles from the one or more tiles. The one or more dependent tiles are dependent on another dependent tile within a coded picture or fouls a logical atomic unit with another dependent tile. The computer executable program code instructions further include program code instructions configured, upon execution, to decode the bitstream according to the indication of the in-picture-prediction-enabled tile set.

In some implementations of such a computer program product, the indication of the in-picture-prediction-enabled tile set is encoded in one or more of: a sequence parameter set associated with the bitstream, a picture parameter set associated with the bitstream, or a supplemental enhancement information message associated with the bitstream. In some embodiments, the indication indicates whether the in-picture-prediction-enabled tile set is a temporal motion-constrained tile set. In some embodiments, the indication comprises a dependency forest or graph that indicates a set of prediction dependencies for one or more tiles that are not other non-in-picture predicted tiles to one or more tiles of the in-picture-prediction-enabled tile set. In some embodiments, the indication comprises a set of anchor positions for a set of intra block copy motion vectors of a set of dependent tiles in the in-picture-prediction-enabled tile set.

BRIEF DESCRIPTION OF THE DRAWINGS

Figure 1:
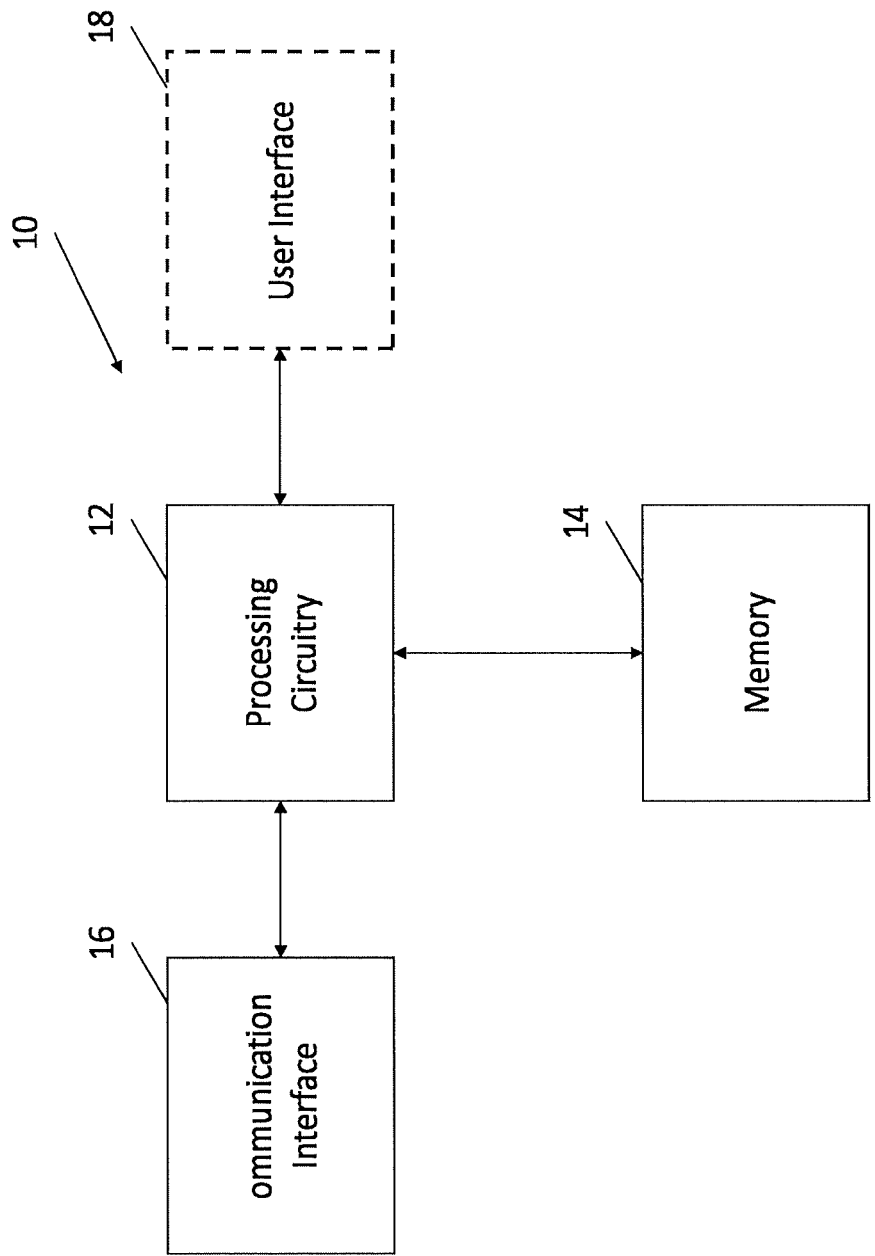
Figure 2:
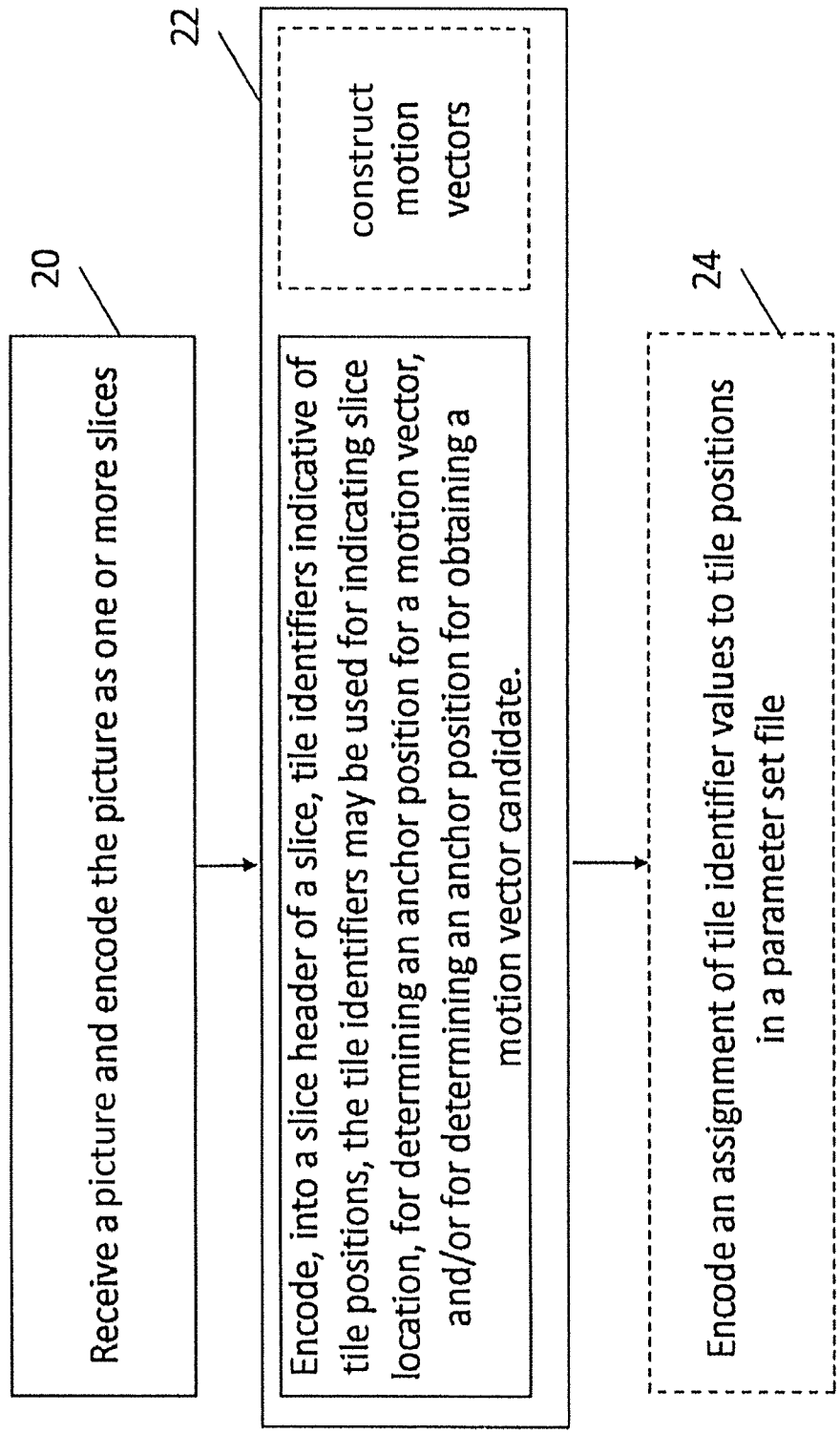
Figure 3:
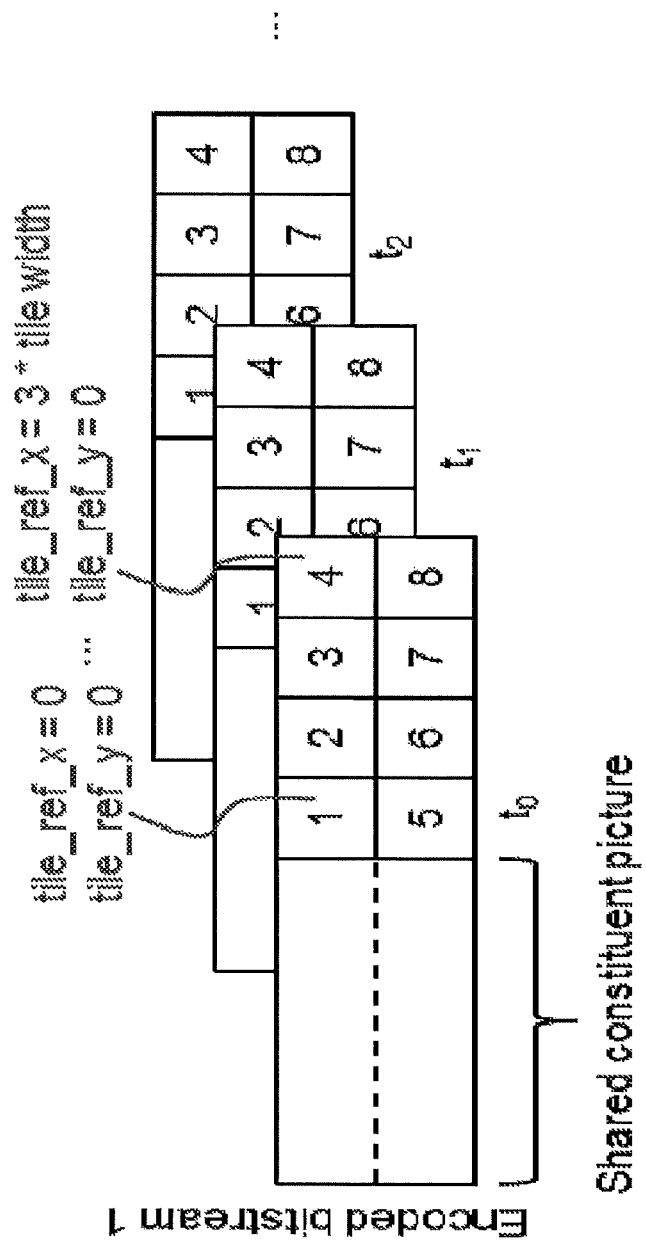
Figure 4:
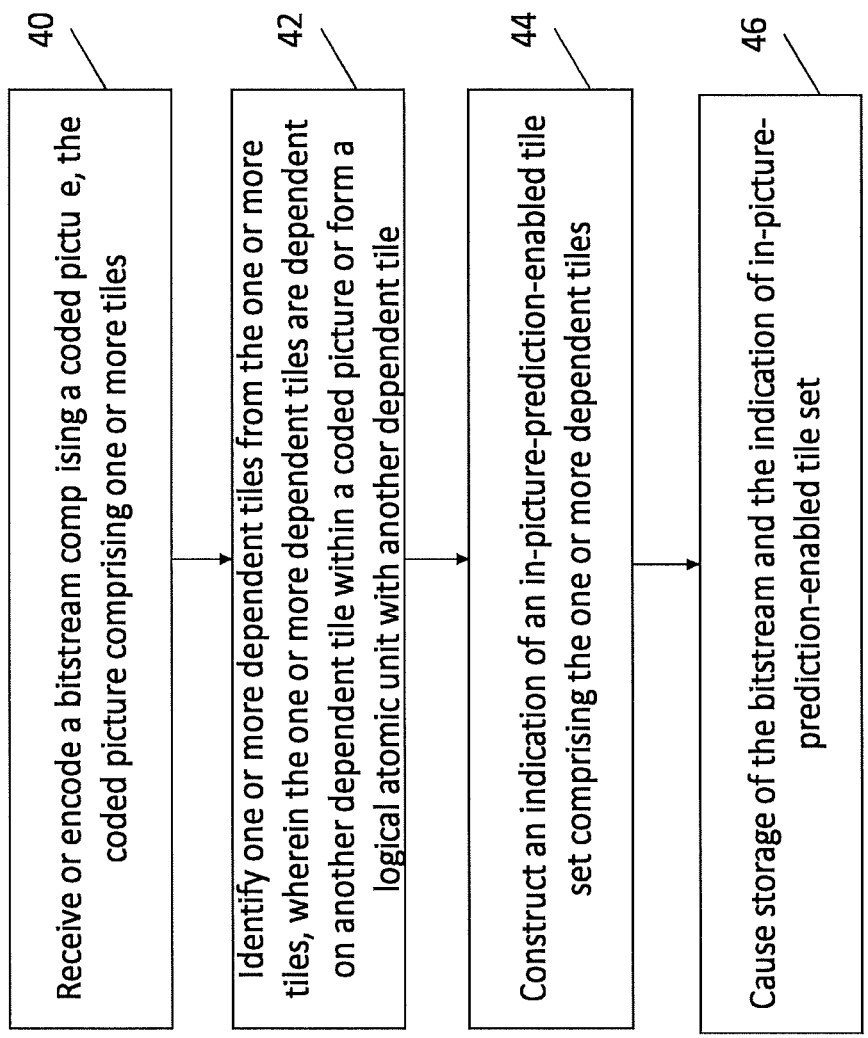
Figure 5B:
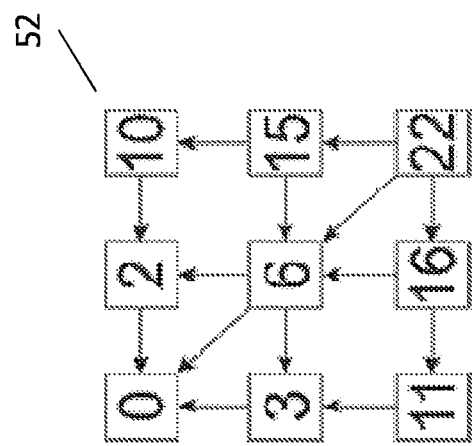
Figure 5A:
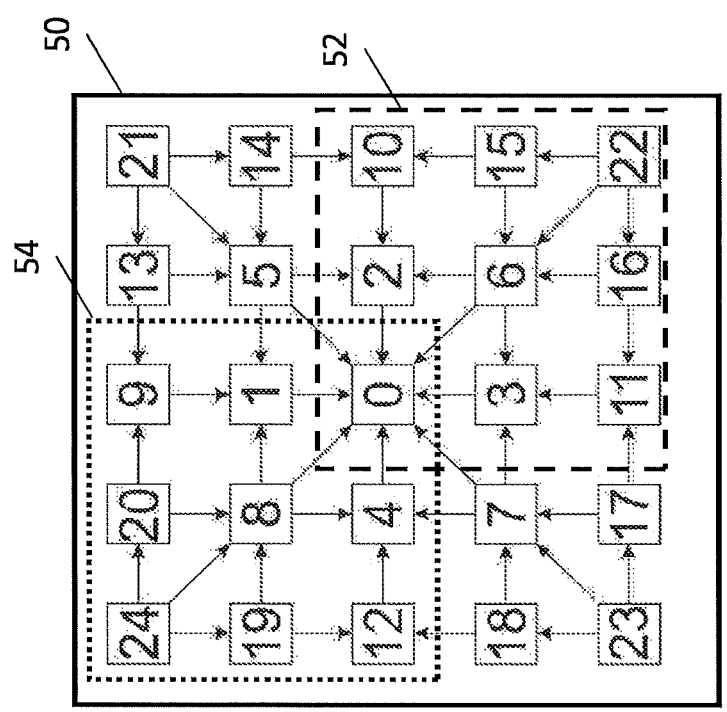
Figure 6:
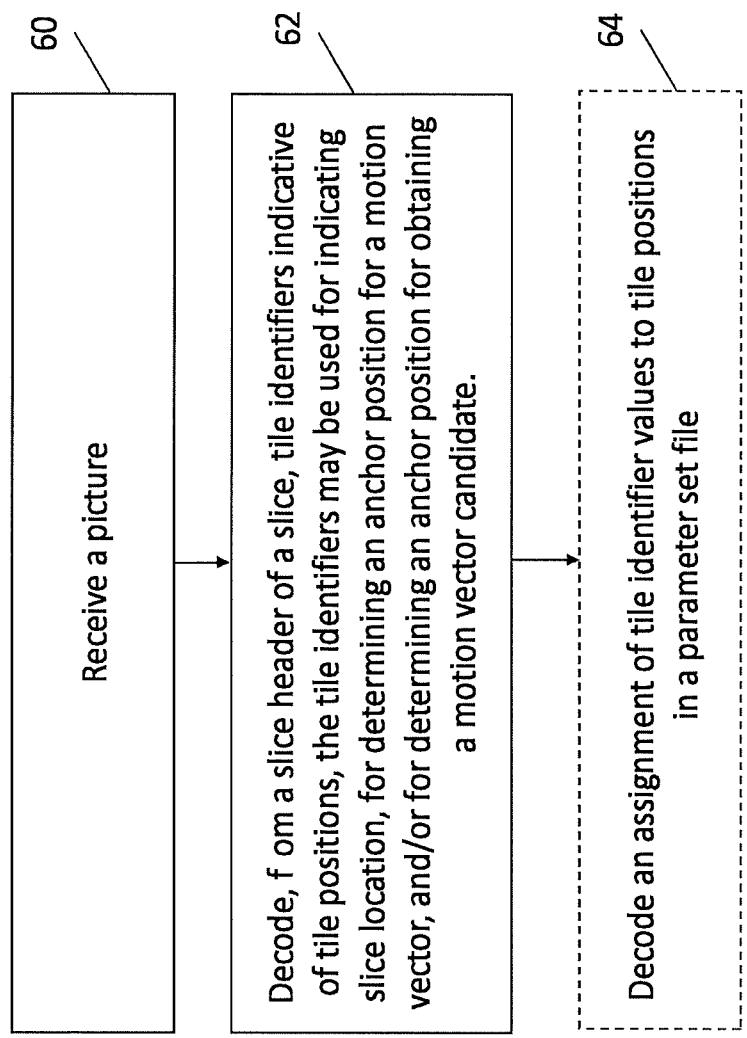
Figure 7:
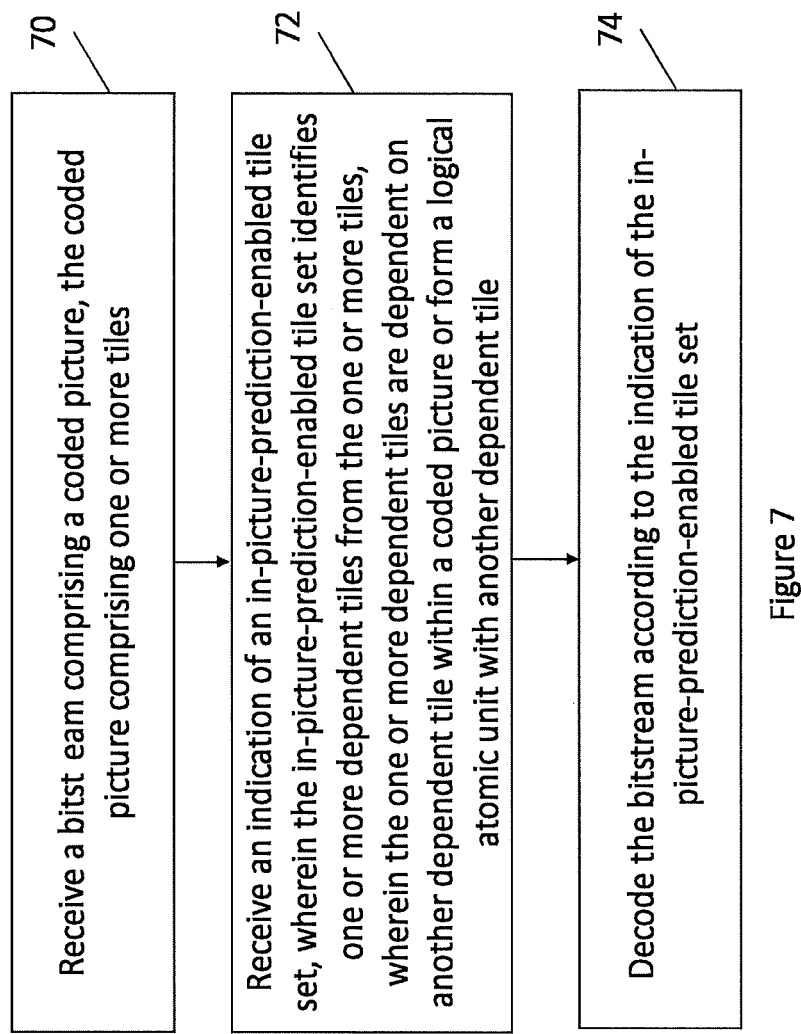

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flowchart illustrating a set of operations performed, such as by the apparatus of FIG. 1, in accordance with an example embodiment of the present disclosure;

FIG. 3 shows example motion vectors in accordance with an example embodiment of the present disclosure;

FIG. 4 is a flowchart illustrating a set of operations performed, such as by the apparatus of FIG. 1, in accordance with an example embodiment of the present disclosure;

FIGS. 5A and 5B depict examples of in-picture-prediction-enabled tile sets constructed and extracted in accordance with an example embodiment of the present disclosure;

FIG. 6 is a flowchart illustrating a set of operations performed, such as by the apparatus of FIG. 1, in accordance with an example embodiment of the present disclosure; and FIG. 7 is a flowchart illustrating a set of operations performed, such as by the apparatus of FIG. 1, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to enable tile-relative addressing in video encoding. The method, apparatus and computer program product may be utilized in conjunction with a variety of video formats including the High Efficiency Video Coding standard (HEVC or H.265/HEVC) or the upcoming Versatile Video Coding standard (VVC, H.266, or H.266/VVC). An example embodiment is described in conjunction with the HEVC, however, the present disclosure is not limited to HEVC, but rather the description is given for one possible basis on top of which an example embodiment of the present disclosure may be partly or fully realized. Particularly, the disclosure may be partly or fully realized with the draft H.266 standard.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format).

When describing HEVC and example embodiments, common notation for arithmetic operators, logical operators, relation operators, bit-wise operators, assignment operators, and range notation e.g. as specified in HEVC may be used. Furthermore, common mathematical functions e.g. as specified in HEVC may be used and a common order or precedence and execution order (from left to right or from right to left) of operators e.g. a specified in HEVC may be used.

When describing HEVC and example embodiments, the following mathematical functions may be used. Ceil(x) is defined as the smallest integer greater than or equal to x. Log 2(x) is defined as the base-2 logarithm of x.

When describing HEVC and example embodiments, the following description may be used to specify the parsing process of each syntax element.

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded syntax element with the left bit first.

An Exponential-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

When describing HEVC and example embodiments, only the relevant parts of syntax structures may be included in the description of the syntax and semantics. Three dots (' . . . ') may be used to indicate that other syntax elements may be included in the syntax structure. It needs to be understood that embodiments could be realized similarly with a different order and names of syntax elements.

When describing HEVC and example embodiments, syntax structures, semantics of syntax elements, and decoding process may be specified as follows. Syntax elements in the bitstream are represented in bold type. Each syntax elements is described by its name (all lower case letters with underscore characteristics), optionally its one or two syntax categories, and one or two descriptors for its method of coded representation. The decoding process behaves according to the value of the syntax element and to the values of previously decoded syntax elements. When a value of a syntax element is used in the syntax tables or the text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing example embodiments, the term file is sometimes used as a synonym of syntax structure or an instance of a syntax structure. For example, a phrase parameter set file may be used to mean a parameter set syntax structure or an instance of a parameter set (with particular values of its syntax elements). In other contexts, the term file may be used to mean a computer file, i.e. a resource forming a standalone unit in storage.

When describing HEVC and example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Video codec comprises an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Infra prediction utilizes the fact that adjacent pixels within the same picture are likely to be correlated. Intra prediction can be performed in spatial or transform domain, i.e., either sample values or transform coefficients can be predicted. When applied in spatial domain, the sample values of adjacent neighboring blocks are used in predicting the sample values of a current block. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded.

A motion vector may be regarded as a two-dimensional Euclidean vector used for inter prediction to indicate the position of a prediction block within a reference picture relative to the position of a block being predicted, such as a current prediction unit being encoded or decoded. A motion vector may point to a fractional sample location, in which case sample values of the prediction block may be interpolated from the sample values of the reference picture.

In-picture prediction may be defined to collectively comprise but is not necessarily limited to one or more of the following: spatial prediction of coding parameters (e.g.

spatial motion vector prediction), intra prediction, intra block copy prediction, in-loop filtering across blocks, and context state updating across blocks in context-adaptive entropy coding. The definition of in-picture prediction may be adjusted depending on the context of referring to the term.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. The filtering may for example include one more of the following: deblocking, sample adaptive offset (SAO), and/or adaptive loop filtering (ALF).

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

The coding parameters, such as motion vectors and quantized transform coefficients, are losslessly encoded into a bitstream. This lossless encoding may be referred to as entropy coding or entropy encoding. The reverse operation of decoding the bitstream into coding parameters may be referred to as entropy decoding. Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

A partitioning may be defined as a division of a set into subsets such that each element of the set is in exactly one of the subsets.

In HEVC, video pictures are divided into coding units (CU) covering the area of the picture. A CU consists of one or more prediction units (PU) defining the prediction process for the samples within the CU and one or more transform units (TU) defining the prediction error coding process for the samples in the CU. A CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g., by recursively splitting the LCU and resultant CUs. Each resulting CU may have at least one PU and at least one TU associated with the CU. Each PU and TU can be further split into smaller PUs and TUs in order to increase granularity of the prediction and prediction error coding processes, respectively. Each PU has prediction information associated with the PU defining what kind of a prediction is to be applied for the pixels within that PU (e.g., motion vector information for inter predicted PUs and intra prediction directionality information for intra predicted PUs).

A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

Each TU can be associated with information describing the prediction error decoding process for the samples within the said TU (including, e.g., Discrete Cosine Transform coefficient information). Whether prediction error coding is applied or not for each CU is signalled at the CU level. In the case where there is no prediction error residual associated with the CU, it can be considered that there are no TUs for the CU. The division of the image into CUs, and the division of CUs into PUs and TUs may be signalled in the bitstream so as to allow the decoder to reproduce the intended structure of these units.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices. Certain types of in-picture prediction, such as intra prediction, intra block copy prediction, and context state prediction for entropy coding, are disabled across tiles. Encoders may control and indicate in the bitstream whether in-loop filtering, such as deblocking filtering, is applied across tiles.

Video coding standards and specifications may allow encoders to divide a coded picture to coded slices or alike. In-picture prediction is typically disabled across slice boundaries. Thus, slices can be regarded as a way to split a coded picture to independently decodable pieces. In HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that no syntax elements or variables outside the MCTS are used in decoding the MCTS. For example, the encoding of an MCTS is constrained in a manner that motion vector candidates are not derived from blocks outside the MCTS. This may be enforced by turning off temporal motion vector prediction (TMVP) of HEVC, or by disallowing the encoder to use the TMVP candidate or any motion vector prediction candidate following the TMVP candidate in the merge or advanced motion vector prediction (AMVP) candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to faun a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets supplemental enhancement information (SEI) message of HEVC can be used to indicate the presence of motion-constrained tile sets in the bitstream.

It needs to be understood that even though some examples and embodiments are described with respect to MCTSs, they could be similarly realized with other similar concepts of independently decodable spatiotemporal units. Moreover, motion constraints for such spatiotemporal units could be specified similarly to how MCTSs above. Example of such spatiotemporal units include but are not limited to motion-constrained slices and motion-constrained pictures. A motion-constrained slice is such that the inter prediction process is constrained in encoding such that no syntax or derived variables outside the motion-constrained slice, no sample value outside the motion-constrained slice, and no sample value at a fractional sample position that is derived using one or more sample values outside the motion-constrained slice, is used for inter prediction of any sample within the motion-constrained slice. When the phrase spatiotemporal unit is used in the context of a single time instance, it can be considered as a spatial unit, corresponding to a certain subset of a coded picture and, when decoded, a certain subset of a decoded picture area.

An elementary unit for the output of an HEVC encoder and the input of an HEVC decoder is a Network Abstraction Layer (NAL) unit. For transport over packet-oriented networks or storage into structured files, NAIL units may be encapsulated into packets or similar structures. A bytestream format has been specified in HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU. In HEVC, the NAL unit type within a certain range indicates a VCL NAL unit, and the VCL NAL unit type indicates a picture type.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the sequence parameter set (SPS) referred to by a syntax element found in the picture parameter set (PPS) referred to by a syntax element found in each slice segment header.

A video parameter set RBSP may include parameters that can be referred to by one or more sequence parameter set RBSPs.

The relationship and hierarchy between video parameter set (VPS), SPS, and PPS may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation. Several SEI messages are specified in HEVC, and the user data SEI messages enable organizations and companies to specify SEI messages for their own use. HEVC contains the syntax and semantics for the specified SEI messages but no process for handling the messages in the recipient is defined. Consequently, encoders are required to follow the HEVC standard when they create SEI messages, and decoders conforming to the HEVC standard are not required to process SEI messages for output order conformance. One of the reasons to include the syntax and semantics of SEI messages in HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture. A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream.

A coded video sequence may be defined as such a sequence of coded pictures in decoding order that is independently decodable and is followed by another coded video sequence or the end of the bitstream or an end of sequence NAL unit.

In many coding modes of HEVC or other codecs, the reference picture for inter prediction is indicated with an index to a reference picture list. The index may be coded with variable length coding, which usually causes a smaller index to have a shorter value for the corresponding syntax element. In HEVC, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) syntax, also known as reference picture list modification syntax structure, which may be contained in slice headers. The initial reference picture lists may be modified through the reference picture list modification syntax structure, where pictures in the initial reference picture lists may be identified through an entry index to the list.

Many coding standards, including HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the AMVP and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

An example of the operation of advanced motion vector prediction is provided in the following, while other similar realizations of advanced motion vector prediction are also possible for example with different candidate position sets and candidate locations with candidate position sets. It also needs to be understood that other prediction mode, such as the merge mode, may operate similarly. Two spatial motion vector predictors (MVPs) may be derived and a temporal motion vector predictor may be derived. They may be selected among the positions: three spatial motion vector predictor candidate positions located above the current prediction block ($B_0$, $B_1$, $B_2$) and two on the left ($A_0$, $A_1$). The first motion vector predictor that is available (e.g. resides in the same slice, is inter-coded, etc.) in a pre-defined order of each candidate position set, ($B_0$, $B_1$, $B_2$) or ($A_0$, $A_1$), may be selected to represent that prediction direction (up or left) in the motion vector competition. A reference index for the temporal motion vector predictor may be indicated by the encoder in the slice header (e.g. as a collocated_ref_idx syntax element). The first motion vector predictor that is available (e.g. is inter-coded) in a pre-defined order of potential temporal candidate locations, e.g. in the order ($C_0$, $C_1$), may be selected as a source for a temporal motion vector predictor. The motion vector obtained from the first available candidate location in the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate. The co-located picture may also be referred to as the collocated picture, the source for motion vector prediction, or the source picture for motion vector prediction.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
- coordinates of a block to which the motion parameters and/or motion information applies, e.g. coordinates of the top-left sample of the block in luma sample units;
- extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

The position of a slice within a picture is indicated through block indexing in raster scan order within a picture. In HEVC, the syntax element slice_segment_address of slice_segment_header( ) specifies the address of the first coding tree block in the slice segment, in the coding tree block raster scan of a picture.

A motion vector anchor position is a position (e.g., horizontal and vertical coordinates) within a picture area relative to which the motion vector is applied. A motion vector anchor position may be regarded as the initial point for the motion vector. While conventionally the motion vector anchor position has been inferred to be the same as the position of the block being predicted, it has been proposed that a horizontal offset and a vertical offset for adapting the motion vector anchor position could be encoded into the bitstream and/or decoded from the bitstream. A horizontal offset and a vertical offset for the anchor position may be given in the slice header, slice parameter set, tile header, tile parameter set, or the like.

An example encoding method taking advantage of a motion vector anchor position comprises: encoding an input picture into a coded constituent picture; reconstructing, as a part of said encoding, a decoded constituent picture corresponding to the coded constituent picture; encoding a spatial region into a coded tile, the encoding comprising: determining a horizontal offset and a vertical offset indicative of a region-wise anchor position of the spatial region within the decoded constituent picture; encoding the horizontal offset and the vertical offset; determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating that the prediction unit is predicted relative to a prediction-unit anchor position that is relative to the region-wise anchor position; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

An example decoding method wherein a motion vector anchor position is used comprises: decoding a coded tile into a decoded tile, the decoding comprising: decoding a horizontal offset and a vertical offset; decoding an indication that a prediction unit at position of a first horizontal coordinate and a first vertical coordinate of the coded tile is predicted relative to a prediction-unit anchor position that is relative to the horizontal and vertical offset; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to comprise arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

A recent trend in 360° video streaming for reducing streaming bitrate may be called viewport-dependent streaming or viewport-adaptive streaming, and may be briefly described as follows: a subset of 360-degree video content covering the primary viewport (i.e., the current view orientation) is transmitted at the best quality/resolution, while the remaining of 360-degree video is transmitted at a lower quality/resolution. Viewport-adaptive streaming may be realized through a tile-based encoding and streaming approaches. In one approach of tile-based encoding and streaming, encoding is performed in a manner that the resulting bitstream comprises motion-constrained tile sets. Several bitstreams of the same source content are encoded using motion-constrained tile sets. One or more motion-constrained tile set (MCTS) sequences are extracted from a bitstream, and each extracted motion-constrained tile set sequence is stored as a track (e.g. an HEVC tile track or a subpicture track) in a file. The client selectively receives tracks in a manner that better quality or higher resolution MCTS tracks may be received for the current viewport compared to the quality or resolution covering the remaining, currently non-visible viewports. The client merges the content of the received tracks, i.e. merges the received MCTSs, into a bitstream to be decoded. Since the viewing orientation may change over time, the selected tracks and MCTSs may also change over time and additionally the position of the respective MCTSs within the merged pictures may change from one merged picture to another.

It is often desirable to reposition slices/tiles or extract a subset of slices/tiles. One typical instance is the situation where one may extract a tile set from an existing stream to create another stream. For example, one may extract a motion-constrained tile set from a bitstream into its own bitstream. Another typical instance is viewport switching in viewport-dependent streaming of 360° video. When slices/tiles can be repositioned in the bitstreams to be decoded without changing the slice or tile content, the repositioning can be done even for encrypted streams.

Because the position of a slice within a picture is indicated through block indexing in raster scan order within a picture, traditionally, repositioning of a slice or extracting a subset of tiles or slices (other than picture-wide subsets starting from the top-left corner of the picture) requires rewriting of slice header(s). Similarly, when motion vector anchor positions are in use, syntax elements indicating locations such as tile_ref_x and tile_ref_y need to be rewritten when repositioning slices/tiles or extracting a subset of tiles or slices to their own bitstream. Rewriting slice headers for the purpose of repositioning a slice is inefficient as slice header rewriting affects the bitrate of the stream and/or requires special rewriting instructions.

An example embodiment set forth herein enables repositioning of tiles in a bitstream without rewriting the slice headers by encoding tile identifiers indicative of the tile in raster scan order of tiles within the tile grid in a parameter set associated with the bitstream.

Regardless of the file format of the video bitstream, the apparatus of an example embodiment may be provided by any of a wide variety of computing devices including, for example, a video encoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Referring now to FIG. 2, the operations performed, such as by the apparatus 10 of FIG. 1, in order to encode a picture into a coded picture, the coded picture being partitioned to two or more tiles, in accordance with an example embodiment are depicted. As shown in block 20, the apparatus includes means, such as the processing circuitry 12, the communication interface 16 or the like, for receiving a picture. The picture is encoded into a coded picture comprising one or more slices. The picture is partitioned into one or more tiles. The coded picture may be a part of a bitstream. The bitstream may be a bitstream formatted in accordance with HEVC, H.266/VVC, or any file formats described above.

As illustrated in block 22, the apparatus 10 includes means, such as the processing circuitry 12, for encoding, into a slice header of a slice, one or more tile identifiers for any set of the following purposes:

Slice location information. A tile identifier is indicative of the tile that comprises a pre-defined or indicated block of the slice, such as the first block of the slice. The block may for example be a coding tree block or a coding tree unit or alike.

Horizontal and vertical offset derivation for determining an anchor position for a motion vector. A tile identifier is indicative of a tile position that is used to derive the horizontal and vertical offset.

Horizontal and vertical offset derivation for determining an anchor position for obtaining a motion vector candidate from an indicated picture in TMVP or alike operation.

In an embodiment for encoding a tile identifier for slice location information, the syntax of a slice segment header is as follows:

| slice_segment_header( ) { | Descriptor |
|---|---|
| slice_pic_parameter_set_id | ue(v) |
| slice_tile_id | u(v) |
| ... | |
| } | | slice_pic_parameter_set_id specifies the picture parameter set in use. For example, when the picture parameter set syntax comprises pps_pic_parameter_set_id providing an identifier of the PPS, slice_pic_parameter_set_id specifies the value of pps_pic_parameter_set_id for the PPS in use. slice_tile_id specifies that the first coding tree block in the slice segment is the top-left coding tree block of the tile identified by the slice_tile_id value. The length of the slice_tile_id syntax element is determined by the PPS in use. Alternatively, in another embodiment, the slice_tile_id is of type ue(v) and hence its length is implicitly indicated rather than determined by the PPS in use.

In an embodiment, the length of a fixed-length tile identifier codeword, such as slice_tile_id in various embodiments, is inferred by the number of tiles in the picture, e.g. as indicated by the PPS in use. In some embodiments, the inferred number of tiles in the picture is set to be equal to NumTilesInPic and the length of a tile identifier codeword would be determined to be Ceil(Log 2(NumTilesInPic)) bits. For example, the PPS in use may indicate the number of tile rows and columns and NumTilesInPic may be obtained by multiplying the number of tile rows by the number of tile columns.

In an embodiment, the length of a fixed-length tile identifier codeword, such as slice_tile_id in various embodiments, is indicated (by an encoder) or decoded (by a decoder) in a high-level syntax structure, such as a picture parameter set or a sequence parameter set. This embodiment may be advantageous in some use cases, since the length of tile identifiers in slice headers or alike become independent of the tile grid or picture size, enabling extracting of a subset of tiles into their own bitstream without slice header modifications or with fewer slice header modifications. For example, the following syntax of a picture parameter set may be used:

| pic_parameter_set_rbsp( ) { | Descriptor |
|---|---|
| ... | |
| tiles_enabled_flag | u(1) |
| if( tiles_enabled_flag ) { | |
| ... | |
| tile_id_len_minus1 | ue(v) |
| ... | |
| } | |
| ... | |
| } | |

The semantics of the syntax elements above may be specified as follows. tiles_enabled_flag indicates whether there is more than one tile in each picture referring to the PPS. If tile_enbable_flag is equal to 1, there is more than one tile in each picture referring to the PPS. If tiles_enabled_flag is equal to 0, there is only one tile in each picture referring to the PPS. tile_id_len_minus1+1 specifies the length in bits of the tile identifier syntax element(s), such as slice_tile_id in various embodiments.

In another example embodiment, the following syntax of a picture parameter set may be used:

| pic_parameter_set_rbsp( ) { | Descriptor |
|---|---|
| ... | |
| tiles_enabled_flag | u(1) |
| if( tiles_enabled_flag ) { | |
| ... | |
| num_tile_columns_minus1 | ue(v) |
| num_tile_rows_minus1 | ue(v) |
| rel_tile_id_len | ue(v) |
| ... | |
| } | |
| ... | |
| } | |

In some embodiments, the semantics of the syntax elements above may be specified as follows. tiles_enabled_flag specifies whether there is more than one tile in each picture referring to the PPS. If tiles_enabled_flag is equal to 1, there is more than one tile in each picture referring to the PPS. If tiles_enabled_flag is equal to 0, there is only one tile in each picture referring to the PPS. num_tile_columns_minus1 specifies the number of tile columns partitioning the picture minus one. num_tile_rows_minus1 specifies the number of tile rows partitioning the picture minus one. In some embodiments, NumTilesInPic is set to be equal to (num_tile_columns_minus1+1)*(num_tile_rows_minus1+1). In some embodiments, a derived variable MinBitsTileId is introduced and set to be equal to Ceil(Log 2(NumTilesInPic)) bits syntax element. rel_tile_id_len specifies the number of additional bits in addition to MinBitsTileId used for tile identifier syntax element(s). The length in bits of the tile identifier syntax element(s), such as slice_tile_id in various embodiments, is equal to MinBitsTileId+rel_tile_id_len.

In an embodiment, an encoder encodes and/or a decoder decodes two syntax elements from which the tile identifier is derived. The syntax elements may be referred to as a multiplier factor and an additive factor. In an embodiment, the tile identifier is derived by multiplying the multiplier factor with the tile grid width and adding the additive factor. In another embodiment, the tile identifier is derived by multiplying the multiplier factor with the tile grid height and adding the additive factor. This approach may be beneficial when variable length coding of the syntax elements is used, particularly for the first slice of the picture and for slices that are aligned with the start of tile rows or tile columns. The following syntax or alike may be used for this embodiment. It is noted that embodiments may be similarly realized with any order of the syntax elements in the following syntax structure.

| slice_segment_header( ) { | Descriptor |
|---|---|
| slice_tile_mul | ue(v) |
| slice_tile_add | ue(v) |
| slice_pic_parameter_set_id | ue(v) |
| ... | |
| } | | slice_tile_mul and slice_tile_add specify that the first coding tree block in the slice segment is the top-left coding tree block of the tile identified by the slice_tile_mul*(num_tile_columns_minus1+1)+slice_tile_add. slice_pic_parameter_set_id specifies the picture parameter set in use. For example, when the picture parameter set syntax comprises pps_pic_parameter_set_id providing an identifier of the PPS, slice_pic_parameter_set_id specifies the value of pps_pic_parameter_set_id for the PPS in use. In some embodiments, fixed-length coding, i.e. u(v), may be used for one or both of slice_tile_mul and slice_tile_add.

In an embodiment, a grid or a partitioning of indicating tile or slice positions is indicated or decoded separately from the tile grid. For example, the following syntax may be used:

| pic_parameter_set_rbsp( ) { | Descriptor |
|---|---|
| ... | |
| num_slice_tile_id_columns_minus1 | ue(v) |
| num_slice_tile_id_rows_minus1 | ue(v) |
| for( i = 0; i < num_slice_tile_id_columns_minus1; i++ ) | |
|   id_column_width_minus1[ i ] | ue(v) |

-continued

| pic_parameter_set_rbsp( ) { | Descriptor |
|---|---|
|   for( i = 0; i < num_slice_tile_id_rows_minus1; i++ ) | |
|     id_row_height_minus1[ i ] | ue(v) |
|   ... | |
| } | | num_slice_tile_id_columns_minus1 specifies the number of columns partitioning the picture minus one. num_slice_tile_id_rows_minus1 specifies the number of rows partitioning the picture minus one. id_column_width_minus1[i] specifies the width of the i-th column in units of coding tree blocks minus one. id_row_height_minus1[i] specifies the height of the i-th row in units of coding tree blocks minus one. Tile identifier values (e.g. slice_tile_id) are associated with a spatial location along the grid specified with these syntax elements. When the term "tile grid" is referred in various embodiments, those embodiments can similarly be realized with the grid specified by these syntax elements or alike, hereafter referred to as the identifier grid. The semantics of slice_tile_id may be specified to be the first coding tree block in the slice segment is the top-left coding tree block of the grid cell (of the identifier grid) that is identified by the slice_tile_id value.

In an embodiment, the vertices of the tile grid collocate with the vertices identifier grid but may be sparser. The vertices of the tile grid may be indicated relative to the identifier grid, i.e., it may be indicated which vertex of the identifier grid is also a vertex of the tile grid. For example, the following syntax may be used:

| pic_parameter_set_rbsp( ) { | Descriptor |
|---|---|
|   ... | |
|   if( tiles_enabled_flag ) { | |
|     ... | |
|     for( i = 0; i < num_slice_tile_id_columns_minus1; i++ ) | |
|       tile_column_flag[ i ] | u(1) |
|     for( i = 0; i < num_slice_tile_id_rows_minus1; i++ ) | |
|       tile_row_flag[ i ] | u(1) |
|     ... | |
|   } | |
| } | | tile_column_flag[i] specifies whether the i-th (right-side) column boundary in the identifier grid is a tile column boundary. If tile_column_flag[i] is equal to 1, the i-th (right-side) column boundary in the identifier grid is a tile column boundary. If tile_row_flag[i] is equal to 0, the i-th row boundary (below the i-th row) in the identifier grid is not a tile row boundary. tile_column_flag[i] specifies whether that the i-th row boundary in the identifier grid is a tile row boundary. If tile_column_flag[i] is equal to 1, the i-th row boundary in the identifier grid is a tile row boundary.

The use of the identifier grid facilitates mixed use of motion-constrained slices and MCTSs in some use cases.

In some embodiments tile identifiers are assigned to tile positions in a raster scan order of tiles within a tile grid. In some embodiments, the tile identifiers take the form of tile_id syntax elements or alike. The tile_id values may be assigned in a pre-defined manner, e.g., 0, 1, 2, 3, . . . in raster scan order of tiles within the tile grid.

In an embodiment, tile identifier values (i.e., tile_id values or alike) are explicitly assigned to tile positions in or along the bitstream, e.g., in a picture parameter set, e.g., as a list of tile identifier values in in raster scan order of tiles within the tile grid. In the absence of indicated identifiers, a pre-defined indexing scheme may be utilized.

In an embodiment, it is indicated in or along the bitstream, e.g., in a sequence parameter set or a picture parameter set, if tile identifier values are assigned in a pre-defined manner or explicitly assigned in or along the bitstream.

As illustrated in block 24, the apparatus 10 may further include means, such as the processing circuitry 12, for optionally encoding an assignment of the tile identifier values to tile positions in a parameter set file. Example parameter set files include a picture parameter set file, a sequence parameter set file, a video parameter set file, or the like.

In an example embodiment, the following syntax of a picture parameter set may be used:

| pic_parameter_set_rbsp( ) { | Descriptor |
|---|---|
|   ... | |
|   tiles_enabled_flag | u(1) |
|   if( tiles_enabled_flag ) { | |
|     ... | |
|     explicit_tile_id_order_flag | u(1) |
|     if( explicit_tile_id_order_flag ) | |
|       for( i = 0; i < NumTilesInPic; i++ ) | |
|         tile_id[ i ] | u(v) |
|     ... | |
|   } | |
|   ... | |
| } | | tile_enabled_flag may be specified as described above, and the semantics of the other syntax elements above may be specified as follows: explicit_tile_id_order_flag equal to 0 indicates that tile identifier values are assigned to tile positions in a pre-defined manner, e.g., 0, 1, 2, 3, . . . in raster scan order of tiles within the tile grid. explicit_tile_id_order_flag specifies whether the tile identifier order for tiles of the picture for which this PPS is in use is specified by the tile_id[i] syntax elements. If explicit_tile_id_order_flag is equal to 1, the tile identifier order for tiles of the picture for which this PPS is in use is specified by the tile_id[i] syntax elements. tile_id[i] specifies the tile identifier of the i-th tile in raster scan order of tiles within the tile grid.

The apparatus may also construct a block index relative to a tile. In some embodiments, the block index includes a syntax element indicative of a block position for a block within the tile. For example, the block index may be indicated with a single syntax element, e.g., block_index_wrt_tile_id syntax element, or with two syntax elements, e.g., first_slice_segment_in_tile_flag and block_index_wrt_tile_id. first_slice_segment_in_tile_flag indicates whether the slice address co-incides with the top-left block of a tile. block_index_wrt_tile_id is indicative of the block position within a tile. In some embodiments, the presence of block index for a slice address is controlled in a picture parameter set.

In an example embodiment, the following picture parameter set and slice segment header syntax structures are used:

| pic_parameter_set_rbsp( ) { | Descriptor |
|---|---|
|   ... | |
|   tiles_enabled_flag | u(1) |
|   if( tiles_enabled_flag ) { | |
|     ... | |
|     tile_aligned_slices_flag | u(1) |
|     ... | |

| pic_parameter_set_rbsp( ) { | Descriptor |
|---|---|
| } | |
| ... | |
| } | |

| slice_segment_header( ) { | Descriptor |
|---|---|
|   slice_pic_parameter_set_id | ue(v) |
|   slice_tile_id | u(v) |
|   if( dependent_slice_segments_enabled_flag ) | |
|     dependent_slice_segment_flag | u(1) |
|   if( !dependent_slice_segment_flag ) { | |
|     if( tile_aligned_slices_flag = = 0) | |
|       block_index_wrt_tile_id | u(v) |
|     ... | |
|   } | |
|   ... | |
| } | |

The semantics of tiles_enabled_flag, slice_pic_parameter_set_id, and slice_tile_id are described above. tile_aligned_slices_flag specifies whether all slices (or all independent slice segments) start from the top-left corner of a tile, i.e. that the first CTU of each slice is the top-left CTU of a tile. If tile_aligned_slices_flag is equal to 0, slices (or independent slice segments) may or may not start from the top-left corner of a tile, i.e. that the first CTU of a slice may or may not be the top-left CTU of a tile. If tile_aligned_slices_flag is equal to 1, all slices (or all independent slice segments) start from the top-left corner of a tile. dependent_slice_segment_flag specifies whether the value of each slice segment header syntax element that is not present is inferred to be equal to the value of the corresponding slice segment header syntax element in the slice header. If dependent_slice_segment_flag is equal to 1, the value of each slice segment header syntax element that is not present is inferred to be equal to the value of the corresponding slice segment header syntax element in the slice header. block_index_wrt_tile_id specifies the address of the first coding tree block in the slice segment, in coding tree block raster scan of the tile identified by slice_tile_id. The length of the slice_segment_address syntax element is Ceil(Log 2(TileSizeInCtbsY)) bits, where TileSizeInCtbsY is the number of luma coding tree blocks of the tile. In another embodiment, block_index_wrt_tile_id has type ue(v) instead of u(v).

In an embodiment, a block index relative to a tile is indicated with two syntax elements, one indicating a horizontal position of the block within the tile, and another indicating a vertical position of the block within the tile. The type of the two syntax elements may be e.g. ue(v) or u(v). When u(v) is used the length of the syntax elements may be determined by the number of block rows and the number of block columns.

In some embodiments, the apparatus 10 further includes means, such as the processing circuitry 12, for constructing one or more motion vectors associated with one or more prediction units in one or more coding units in the one or more tiles. The one or more motion vectors comprise one or more anchor location identifiers, each defining a position relative to the one or more tiles indicated by the one or more tile identifiers. Motion vectors include anchor identifiers in the form of syntax elements indicative of a pre-defined position, such as tile_ref_x and tile_ref_y, referred to as the horizontal and vertical offset, respectively. As described above, the horizontal and vertical offset are used to determine an anchor position for applying the motion vector to obtain a prediction block. In an example illustrated in FIG. 3, anchor indentifiers are used for 360-degree video, where a shared coded picture at base quality and tiles at enhanced quality are coded within the same coded picture, and where the shared coded picture and enhanced-quality tiles of the same coded picture originate from the same 360-degree picture. In FIG. 3, anchor indentifiers for an enhanced-quality tile indicate a location within a shared constituent picture.

In some embodiments, anchor position(s) for motion vectors are indicated through tile identifier(s), such as tile_id value(s) or alike, rather than x and y sample coordinates relative to the picture. The motion vector anchor position is derived to be a pre-defined location relative to the tile identified by the tile identifier (e.g. the tile_id value), such as the top-left corner of the tile identified by the tile identifier (e.g. the tile_id value).

An embodiment for decoding a coded tile into a decoded tile comprises the following:
  decoding a tile identifier intended for deriving a motion vector anchor position;
  deriving a tile position from the tile identifier;
  deriving a horizontal offset and a vertical offset from the tile position;
  decoding an indication that a prediction unit at position of a first horizontal coordinate and a first vertical coordinate of the coded tile is predicted relative to a prediction-unit anchor position that is relative to the horizontal and vertical offset;
  deriving a prediction-unit anchor position equal to sum of the first horizontal coordinate and the horizontal offset, and the first vertical coordinate and the vertical offset, respectively;
  determining a motion vector for the prediction unit; and
  applying the motion vector relative to the prediction-unit anchor position to obtain a prediction block.

An embodiment for encoding taking advantage of a motion vector anchor position comprises the following:
  encoding an input picture into a coded constituent picture;
  reconstructing, as a part of said encoding, a decoded constituent picture corresponding to the coded constituent picture;
  encoding a spatial region into a coded tile, the encoding comprising:
    determining a tile position within a coded constituent picture, wherein the tile position is indicative of a horizontal offset and a vertical offset that are indicative of a region-wise anchor position of the spatial region within the decoded constituent picture;
    encoding a tile identifier that is indicative of the tile position;
    determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region;
    indicating that the prediction unit is predicted relative to a prediction-unit anchor position that is relative to the region-wise anchor position;
    deriving a prediction-unit anchor position equal to sum of the first horizontal coordinate and the horizontal offset, and the first vertical coordinate and the vertical offset, respectively;

determining a motion vector for the prediction unit; and applying the motion vector relative to the prediction-unit anchor position to obtain a prediction block.

In an embodiment, the tile identifier intended for deriving a motion vector anchor position is inferred to be same as the tile identifier for slice location information. The above-described embodiments apply as follows: when the tile identifier of the coded tile (comprising the prediction unit) is equal to a specific value denoted as tileIdA, the tile identifier intended for deriving a motion vector anchor position is inferred to be equal to tileIdA, and a tile position of the tile with tile identifier equal to tileIdA in a reference picture for the motion vector is used in the motion vector anchor position derivation. This embodiment establishes a tile correspondence between pictures based on the same tile identifier value. In an embodiment for encoding, it is indicated in or along the bitstream, e.g. in PPS, SPS, or VPS, that the tile identifier intended for deriving a motion vector anchor position is inferred to be same as the tile identifier for slice location information. In an embodiment, it is decoded from or along the bitstream, e.g. from PPS, SPS, or VPS, that the tile identifier intended for deriving a motion vector anchor position is inferred to be same as the tile identifier for slice location information. The indication may be specific for an indicated set of tile identifiers or may apply to all tile identifiers. For example, the following syntax or alike may be used for an indication applying to all tile identifiers:

| pic_parameter_set_rbsp( ) { | Descriptor |
|---|---|
| ... | |
| tiles_enabled_flag | u(1) |
| if( tiles_enabled_flag ) { | |
| ... | |
| tile_id_relative_motion_flag | u(1) |
| ... | |
| } | |
| ... | |
| } | | tile_id_relative_motion_flag specifies whether horizontal and vertical offsets for deriving motion vector anchor position are not in use. tile_id_relative_motion_flag equal to 0 indicates that horizontal and vertical offsets for deriving motion vector anchor position are not in use. tile_id_relative_motion_flag equal to 1 indicates that horizontal and vertical offsets for deriving motion vector anchor position are in use and are derived from the tile identifier of the coded tile as described above.

In some embodiments, a tile identifier intended for deriving a motion vector anchor position is accompanied by a block index, wherein the block index includes a syntax element indicative of a block position for a block within the tile. For example, the block index may be indicated with a single syntax element, e.g., block_index_wrt_tile_id syntax element, or with two syntax elements, e.g., first_block_in_tile_flag and block_index_wrt_tile_id. first_block_in_tile_flag indicates whether the horizontal and vertical offsets coincide with the top-left corner of a tile. block_index_wrt_tile_id is indicative of a block position within a tile, and the horizontal and vertical offsets are derived from the block position in a pre-defined manner, e.g. from the top-left corner of the block position. In some embodiments, the presence of block index for deriving motion vector anchor position is controlled in a picture parameter set. Embodiments related to the block index for a tile identifier indicating slice location information apply similarly to the block index for a tile identifier intended for deriving a motion vector anchor position.

In some embodiments, reference tile identifiers for deriving motion vector anchor position may be provided (e.g., in a slice header) for indicated pictures in reference picture list(s). For example, for each occurrence of the current picture in a reference picture list, a slice header may include a flag indicating if a conditional motion vector anchor position is in use for that reference index, and if it is, the slice header also contains a the id for that reference index indicating the motion vector anchor position.

In an example embodiment, the syntax of the slice segment header is like the following and it includes a syntax structure, herein referred to as ref_pic_anchor_offsets( ), for indicating tile identifier values for the derivation of motion vector anchor positions.

| slice_segment_header( ) { | Descriptor |
|---|---|
| ... | |
| if( slice_type = = P \| \| slice_type = = B ) { | |
| num_ref_idx_active_override_flag | u(1) |
| if( num_ref_idx_active_override_flag ) { | |
| num_ref_idx_l0_active_minus1 | ue(v) |
| if( slice_type = = B ) | |
| num_ref_idx_l1_active_minus1 | ue(v) |
| } | |
| if( lists_modification_present_flag && NumPicTotalCurr > 1 ) | |
| ref_pic_lists_modification( ) | |
| ... | |
| ref_pic_anchor_offsets( ) | |
| ... | |
| } | |
| ... | |
| } | |

| ref_pic_anchor_offsets( ) { | Descriptor |
|---|---|
| for( i = 0; i <= num_ref_idx_l0_active_minus1; i++ ) | |
| if( IsCurrPic( RefPicList0[ i ] ) ) { | |
| mv_anchor_pos_l0_flag[ i ] | u(1) |
| if( mv_anchor_pos_l0_flag[ i ] ) | |
| anchor_tile_id_l0[ i ] | u(v) |
| } | |
| if slice_type = = B ) { | |
| for( i = 0; i <= num_ref_idx_l1_active_minus1; i++ ) | |
| if( IsCurrPic( RefPicList1[ i ] ) ) { | |
| mv_anchor_pos_l1_flag[ i ] | u(1) |
| if( mv_anchor_pos_l1_flag[ i ] ) | |
| anchor_tile_id_l1[ i ] | u(v) |
| } | |
| } | |
| } | | num_ref_idx_active_override_flag specifies whether the syntax element num_ref_idx_l0_active_minus1 is present for P and B slices and that the syntax element num_ref_idx_l1_active_minus1 is present for B slices. If num_ref_idx_active_override_flag is equal to 1. the syntax element num_ref_idx_l0_active_minus1 is present for P and B slices and that the syntax element num_ref_idx_l1_active_minus1 is present for B slices. If num_ref_idx_active_override_flag is equal to 0, the syntax elements num_ref_idx_l0_active_minus1 and num_ref_idx_l1_active_minus1 are not present. num_ref_idx_l0_active_minus1 specifies the maximum reference index for reference picture list 0 that may be used to decode the slice. When the current slice is a P or B slice and num_ref_idx_l0_active_minus1 is not present, num_ref_idx_l0_active_minus1 is inferred to be equal to num_ref_idx_l0_default_active_minus1, which is provided in the PPS (but could in alternative designs reside in SPS or VPS). num_ref_idx_l1_active_minus1 specifies the maximum reference index for reference picture list 1 that may be used to decode the slice. When num_ref_idx_l1_active_minus1 is not present, num_ref_idx_l1_active_minus1 is inferred to be equal to num_ref_idx_l1_default_active_minus1, which is provided in the PPS (but could in alternative designs reside in SPS or VPS).

IsCurrPic(picInp) is a function that returns 0, when picInp is not the current picture being encoded or decoded, and returns 1, when picInp is the current picture being encoded or decoded. In the following, X is equal to 0 or 1 for reference picture list 0 or 1, respectively. mv_anchor_pos_lX_flag[i] specifies whether motion vector anchor position is used in inter prediction for this reference picture. mv_anchor_pos_lX_flag[i] equal to 0 indicates that motion vector anchor position is not used in inter prediction for this reference picture. mv_anchor_pos_lX_flag[i] equal to 1 indicates that motion vector anchor position is used in inter prediction for this reference picture. anchor_tile_id_lX[i] equal to 0 indicates that the tile identifier based on which a tile position is obtained for deriving a motion vector anchor position as described in other embodiments.

In some embodiments, reference tile_id identifiers may be provided (e.g., in a slice header) or inferred for pictures in reference picture list(s). For example, a tile identifier may be provided (e.g., in a slice header) for each instance of the current picture in reference picture list(s). For temporal reference picture or for reference pictures other than the current picture, a reference tile_id identifier may be inferred to be equal to the current tile_id identifier, or motion vector anchor position may be inferred not to be used.

In some embodiments, in addition to a tile identifier, the horizontal and vertical offsets for a motion vector anchor position may be indicated by a block index indicating the block position relative to a pre-defined position of the tile indicated by the tile identifier, such as the top-left corner of the tile, In some embodiments, in addition to a tile identifier, the horizontal and vertical offsets for a motion vector anchor position may be indicated with x and y pixel coordinates relative to a pre-defined position of the tile indicated by the tile identifier, such as the top-left corner of the tile.

In some embodiments, the anchor position is configured to be applied when determining the collocated block for a collocated picture in a TMVP operation or similar operations. The anchor position may be conditionally applied, e.g., when a pre-defined condition is true or when indicated by the encoder. The anchor position may be derived identically or similarly to how an anchor position for motion vector derivation is derived in various embodiments.

In some embodiments, when the collocated picture for TMVP is indicated to be the current picture, the motion vector anchor position is applied to find the collocated block, that is, the collocated block is selected on the basis of (tile_x+rel_x, tile_y+rel_y), where tile_x and tile_y may be obtained through the reference tile_id. The reference tile_id may be indicated as described above for tile identifier based motion vector anchor positions. Alternatively, a reference tile_id may be conditionally provided, e.g., in a slice header when the collocated picture is indicated to be the current picture.

HEVC slice header syntax comprises first_slice_segment_in_pic_flag. When equal to 1, it specifies that the slice segment is the first slice segment of a picture in decoding order. first_slice_segment_in_pic_flag equal to 0 specifies that the slice segment is not the first slice segment of a picture in decoding order. This syntax element may be used for detection of the boundary between coded pictures that are consecutive in decoding order. If slices are reordered or a subset of slices is extracted, first_slice_segment_in_pic_flag (or any syntax element with similar definition) may have to be rewritten. In an approach, first_slice_segment_in_pic_flag or alike is not included in the slice header syntax but rather a different start code is used for the first slice segment of a picture than for other slice segments of a picture. In another approach, first_slice_segment_in_pic_flag or alike is not included in the slice header syntax but rather different syntax element(s), such as picture order count, are used in determining the first slice segment of the picture. In an embodiment, first_slice_segment_in_pic_flag or alike is not included in the slice header syntax but rather the tile identifier is used in determining the first slice segment of a picture. When tile identifiers are assigned to tile positions implicitly, it is concluded that a slice segment with a certain tile identifier value, such as 0 (e.g., slice_tile_id equal to 0) is the first slice segment of a picture. When tile identifiers are assigned to tile positions explicitly as described in other embodiments, it is concluded that a slice segment with a certain explicitly indicated tile identifier value is the first segment of a picture. For example, the tile identifier assignment order to tile positions may be indicated in a PPS as described earlier, and a slice segment with a tile identifier equal to the first tile identifier in the list given in a PPS is concluded to be the first slice segment of a picture.

In some embodiments, the apparatus 10 further includes means, such as the processing circuitry 12, for encoding a decoding order constraint file associated with the bitstream in or along the bitstream that includes a reorder indication indicating whether tiles can be reordered without affecting decodability for each of the tiles. For example, the reorder indication may indicate that tiles within a particular tile set may or may not be reordered (as long as their dependency order is obeyed) without affecting their decodability. Alternatively, the reorder indication may indicate that tiles or indicated or inferred tile sets, such as motion-constrained tile sets, may or may not be ordered without affecting their decodability.

The reorder indication may be indicative of one, either, or both of the following: the tiles can be reordered without affecting decodability for each of the tiles, as long as the modified ordering is explicitly provided, e.g. as a list of tile identifier values as described above; the tiles can be reordered without affecting decodability for each of the tiles without modifications in or along the bitstream. In the latter case, tiles may be need to be of the same size (e.g. in terms of width and height in CTUs).

In some embodiments, an encoder may conclude, e.g., based on the above described indication(s), that any tile decoding order that complies with an indicated or inferred tile grid may be used. The encoder may indicate a specific indication, e.g., in a sequence parameter set or an SEI message, that any tile decoding order that complies with an indicated or inferred tile grid may be used.

In some embodiments, when it has been concluded that any tile decoding order that complies with an indicated or inferred tile grid may be used without modifications in or along the bitstream, the encoder may omit encoding of an explicit tile_id list or the like, and/or the decoder may omit the decoding of an explicit tile_id list or the like, which indicates the decoding order or tiles.

In some embodiments, a decoder may conclude, e.g., based on the above described indication(s), that any tile decoding order that complies with an indicated or inferred tile grid may be used. For example, it may be indicated in or along the bitstream that each tile forms a motion-constrained tile set, and the decoder may conclude based on that as well as based on the use of tile-relative addressing that any tile decoding order may be used. For example, if all tiles are of equal size, a decoder may decode the tiles of a picture in any order, which needs not be the same as the encoding order of tiles. For example, a decoder may decode tiles in their reception order. By utilizing tile identifiers, extraction of tile sets can be done without slice header rewriting, e.g., by parameter set modifications only, or with more straightforward slice header modifications. In addition, reordering of tiles can be done without slice header rewriting, e.g., by parameter set modifications only, or with more straightforward slice header changes. In addition, the slice headers will be shorter. For example, for a 16×8 tile grid in an 8192×4096 picture, 64×64 CTU, fixed-length coding as in HEVC, a slice segment address would utilize 13-bit code word. The number of bits saved per picture by utilizing tile identifiers is 468 which corresponds to about 28 kilobits per second in a 60 Hertz video.

Referring now to FIG. 4, the operations performed, such as by the apparatus 10 of FIG. 1, in order to construct an in-picture-prediction-enabled (IPPE) tile set in accordance with an example embodiment are depicted. As shown in block 40, the apparatus includes means, such as the processing circuitry 12, the communication interface 16 or the like, for receiving a bitstream comprising a coded picture that comprises one or more tiles. Alternatively, the apparatus includes means, such as the processing circuitry 12, for encoding a bitstream comprising a coded picture that comprises one or more tiles. The encoding may take as input e.g. an uncompressed picture sequence. The bitstream may be a bitstream formatted in accordance with HEVC, H.266/VVC, or any file formats described above.

As shown in block 42, the apparatus 10 includes means, such as the processing circuitry 12, for identifying one or more dependent tiles from the one or more tiles. In some embodiments, the apparatus receives as a configuration setup or such tile dependency information to be used in encoding. In some embodiments, the apparatus determines tile dependencies as a part of encoding, e.g. a tile of a second view may depend on the respective tile of a first view, where the first and second view are frame-packed. In some embodiments, the apparatus identifies one or more dependent tiles by analyzing metadata files associated with each of the tiles in the bitstream, such as tile identifier for motion vector anchor position derivation. In some embodiments, the apparatus determines dependencies of each of the tiles. Each of the one or more dependent tiles is dependent on another dependent tile within a coded picture or form a logical atomic unit with another dependent tile.

As shown in block 44, the apparatus 10 includes means, such as the processing circuitry 12, for constructing an indication of an in-picture-prediction-enabled tile set comprising the one or more dependent tiles. In some embodiments, a tile within an IPPE tile set does not depend on any tile outside the IPPE tile set for in-picture prediction. In some embodiments, it may be further indicated that tiles outside of a particular IPPE tile set do not depend on any tile within the IPPE tile set.

As shown in block 46, the apparatus 10 includes means, such as the processing circuitry 12, for causing storage of the bitstream and the indication of the in-picture-prediction-enabled tile set. The IPPE tile set may be stored along with or inside the bitstream. Indications of IPPE tile sets may reside, for example, in a sequence parameter set file, a picture parameter set file, a supplemental enhancement information message file, or the like.

In some embodiments, an IPPE tile set can also be indicated by the indications or otherwise (e.g. by using temporal motion-constrained tile set SEI message) to be a temporal motion-constrained tile set. A tile set that is both an IPPE tile set and a temporal motion-constrained tile set can be used for spatial-temporal random access and extraction. Spatial random access is the situation where only a subset of tiles is needed for rendering and indications may be utilized to conclude which tiles are needed for correct decoding of the subset of tiles. In extraction, indications may be utilized to conclude which tiles can be extracted and decoded independently of the other tiles.

In some embodiments, in-picture prediction (e.g., intra block copy) may be enabled between the tiles of an IPPE tile set. In an embodiment, in-picture prediction enabled across tiles of an IPPE tile set comprises one or more of: intra prediction, intra block copy prediction, motion vector candidate derivation from a block of a reference tile to the respective block in a current tile of the same IPPE tile set, in-loop filtering across tiles such as deblocking filtering across adjacent tiles of the same IPPE tile set, context state updating and utilization across tiles in context-adaptive entropy coding. In an embodiment, a slice is allowed to span across a tile boundary within an IPPE tile set even when the slice start position and/or the slice end position is not aligned with a tile boundary. In an embodiment, pre-defined or indicated types of in-picture prediction may be disabled at slice or Video Coding Layer (VCL) NAL unit boundaries within an IPPE tile set. For example, propagating the entropy coding state across VCL NAL unit boundaries may be disabled, which enables parallel entropy encoding and decoding of the VCL NAL units.

In some embodiments, in-picture prediction may be enabled across slice boundaries and in-picture-prediction-enabled sets of slices may be indicated similarly to IPPE tile sets. Likewise, a mixture of slices and tiles across which in-picture prediction is enabled may be indicated and may be referred to as an IPPE set.

In an example embodiment, the following syntax or alike is used for indicating one or more IPPE sets. The syntax may be conditionally included e.g. syntax structures of VPS, SPS, PPS, and/or an SEI message. The absence of the ippe_sets( ) syntax in the containing structure may indicate the absence of IPPE sets.

| ippe_sets( ) { | Descriptor |
|---|---|
| each_grid_cell_one_ippe_set_flag | u(1) |
| if( !each_grid_cell_one_ippe_set_flag ) { | |
| num_sets_minus1 | ue(v) |
| for( i = 0; i <= num_sets_minus1; i++ ) { | |
| ippe_set_id[ i ] | ue(v) |
| num_cell_rects_in_set_minus1[ i ] | ue(v) |
| for( j = 0; j <= num_cell_rects_in_set_minus1[ i ]; j++ ) { | |
| top_left_cell_index[ i ][ j ] | ue(v) |
| bottom_right_cell_index[ i ][ j ] | ue(v) |
| } | |
| } | |
| } | |
| } | | each_grid_cell_one_ippe_set_flag specifies whether each and every grid cell in the identifier grid or the tile grid (whichever is applicable according to other embodiments) in the picture is included in an IPPE set. If each_grid_cell_one_ippe_set_flag is equal to 1, each and every grid cell in the identifier grid or the tile grid in the picture is included in an IPPE set. If each_grid_cell_one_ippe_set_flag is equal to 0, it indicates that such constraint may not be applied. num_sets_minus1 specifies the number of IPPE sets identified in this syntax structure minus one. ippe_set_id[i] specifies an identifier of the i-th IPPE set. num_cell_rects_in_set_minus1 [i] specifies the number of rectangular regions of grid cells (of the identifier grid or the tile grid, whichever is applicable according to other embodiments) in the i-th IPPE set minus one. top_left_cell_index[i][j] and bottom_right_cell_index[i][j] identify the grid cell position of the top-left cell and the grid cell position of the bottom-right cell in a rectangular region of the i-th identified IPPE set, respectively, in tile raster scan order (of the identifier grid or the tile grid, whichever is applicable according to other embodiments).

In an embodiment, a motion-constrained set of tiles and/or slices is indicated in or along the bitstream, e.g. in syntax structures of VPS, SPS, PPS, and/or an SEI message. The absence of the motion-constraint indication syntax in the containing structure may indicate the absence of motion-constrained tile and/or slice sets. For example, the following syntax may be used:

| motion_constrained_sets( ) { | Descriptor |
|---|---|
|   each_grid_cell_one_mc_set_flag | u(1) |
|   if( !each_grid_cell_one_mc_set_flag ) { | |
|     num_sets_minus1 | ue(v) |
|     for( i = 0; i <= num_sets_minus1; i++ ) { | |
|       mc_set_id[ i ] | ue(v) |
|       num_cell_rects_in_set_minus1[ i ] | ue(v) |
|       for( j = 0; j <= num_cell_rects_in_set_minus1[ i ]; j++ ) { | |
|         top_left_cell_index[ i ][ j ] | ue(v) |
|         bottom_right_cell_index[ i ][ j ] | ue(v) |
|       } | |
|     } | |
|   } | |
| } | | each_grid_cell_one_mc_set_flag specifies whether each and every grid cell in the identifier grid or the tile grid (whichever is applicable according to other embodiments) in the picture is included in an motion-constrained set of tiles or slices. each_grid_cell_one_mc_set_flag equal to 1 indicates that each and every grid cell in the identifier grid or the tile grid (whichever is applicable according to other embodiments) in the picture is included in an motion-constrained set of tiles or slices. each_grid_cell_one_mc_set_flag equal to 0 indicates that such constraint may not be applied. num_sets_minus1 specifies the number of motion-constrained sets of tiles or slices identified in this syntax structure minus one. mc_set_id[i] specifies an identifier of the i-th motion-constrained set of tiles or slices. num_cell_rects_in_set_minus1[i] plus 1 specifies the number of rectangular regions of grid cells (of the identifier grid or the tile grid, whichever is applicable according to other embodiments) in the i-th motion-constrained set. top_left_cell_index[i][j] and bottom_right_cell_index[i][j] identify the grid cell position of the top-left cell and the grid cell position of the bottom-right cell in a rectangular region of the i-th identified motion-constrained set, respectively, in tile raster scan order (of the identifier grid or the tile grid, whichever is applicable according to other embodiments).

In an embodiment, an encoder indicates in or along the bitstream, e.g. in a VPS or SPS, and/or a decoder decodes from or along the bitstream, e.g. from a VPS or SPS, if boundaries of a motion-constrained set of tiles or slices are to be treated like picture boundaries. Such an indication may be present in the syntax or such an indication may be allowed to be indicated to be valid only when a motion-constrained set of tiles or slices fulfils certain constraints, such as but not necessarily limited to being of the same rectangular shape and the same size throughout a coded video sequence, and either being on the same spatial location within the pictures of the coded video sequence or a reorder indication indicating that tiles or slices can be reordered without affecting decodability for each of the tiles or slices. Treating boundaries of a motion-constrained set of tiles or slices as picture boundaries may include but is not necessarily limited to one or more of the following: saturating sample locations referenced in inter prediction to be within the motion-constrained set; treating, e.g. in various prediction processes, references to syntax elements and derived variables (e.g. motion vectors) of blocks outside the motion-constrained set of tiles or slices as references to unavailable data. Such treatment of boundaries of a motion-constrained set of tiles or slices effectively enables motion vectors to reference sample locations over the boundaries, where the sample value at the boundary is used as the sample values for the referenced sample locations over the boundaries. In some embodiments, the indication of an IPPE set also includes a dependency forest or graph which indicates one or more tiles that are not in-picture predicted from other tiles and prediction dependencies to the other tiles of the same IPPE tile set.

In some embodiments, an anchor position for intra block copy motion vectors of a dependent tile in an IPPE tile set is indicated or inferred to be relative to an identified reference tile in the same IPPE tile set. In some embodiments, the anchor position may be applied if the current picture is the selected reference picture (e.g., when intra block copy is in use), and not applied otherwise. Tile identifiers as previously described may be used for indicating the anchor position.

In example embodiments for coding plenoptic (a.k.a. dense lightfield) or multiview videos, a plenoptic image or pictures from all views of one time instance are encoded as one coded picture, one tile or tile set per sub-aperture image or one view. Furthermore, in-picture prediction may be enabled between selected tiles or tile sets. An encoder indicates IPPE tile sets, e.g., for each "leaf" tile or tile set from which no other tile or tile set is predicted.

In example embodiments involving patch-based video, such as for video coding of projected point clouds, the apparatus 10, such as the processing circuitry 12, may encode patches of different types (e.g., texture, depth, second-layer texture, second-layer depth, reflectance, etc.) as one coded picture in a manner that one or more entire patches form a tile set. The apparatus may select and indicate IPPE tile sets to comprise related tile sets, such as tile sets of collocated patches of different types. In-picture prediction may be enabled among tiles of an IPPE tile set. For example, intra block copy prediction may be enabled from the first-layer texture tile to the collocated second-layer texture tile, or motion vector prediction as described in other embodiments may be enabled from a tile of a first type (e.g., texture) to a collocated tile of a second type (e.g., depth).

Referring now to FIG. 5A, an example N×M tile grid 50 is used (N=M=5) for coding a plenoptic image/video, one sub-aperture image per tile. In-picture prediction may be used within the tiles of a picture. IPPE tile sets 52 and 54 may be indicated in or along the bitstream associated with the tile grid. Motion-constrained tile sets (MCTS), e.g., one MCTS per tile, may be encoded and indicated in or along the bitstream. Each tile in the tile grid 50 has a tile identifier assigned to it. The tile identifiers indicate the raster scan order of tiles within the tile grid. The following tile_id assignment may be indicated in or along the bitstream:

24, 20, 9, 13, 21,
19, 8, 1, 5, 14,
12, 4, 0, 2, 10,
18, 7, 3, 6, 15,
23, 17, 11, 16, 22

An IPPE tile set, such as IPPE tile set 52, may be extracted. FIG. 5B illustrates an extracted IPPE set 52.

For the extracted bitstream, the following tile_id assignment may be indicated in or along the bitstream (indicating the tile_id order in raster scan order of tiles within the tile grid):

0, 2, 10,
3, 6, 15,
11, 16, 22

As explained earlier, the assignment of tile identifier values to tile positions may be indicated for example in a picture parameter set. As mentioned earlier sample entries of ISOBMFF tracks may contain parameter sets. Thus, an extracted bitstream may be constructed by extracting the VCL NAL units of the desired slices and/or tiles and by modifying assignment of tile identifier values in parameter set(s). The modified parameter sets may be provided in a sample entry for a track whose samples contain the extracted VCL NAL units.

An example embodiment has been described above in relation to slice headers. It needs to be understood that other embodiments apply equally to any other types of headers for picture partitioning units, such as slice segment headers or tile headers.

Certain example embodiments have been described above in relation to tiles. It needs to be understood that other embodiments apply equally to any other types of picture partitioning units or spatiotemporal units, such as slices or slice groups. Tiles and slices have been described above to comprise an integer number of entire coding tree units. It needs to be understood that tile and slices may be more fine-grained in their boundaries. For example, tile width and height could be specified in terms of coding units of certain width and height, such as 8×8 coding units. In another example, a slice could be allowed to comprise an integer number of coding unit but not required to have an integer number of entire coding tree units.

Certain example embodiments have been described above in relation to tile grids and tile identifiers indicating a tile position in a tile grid. It needs to be understood that other embodiments apply equally to identifier grids described in certain example embodiments and grids of other picture partitioning units (e.g. MCTS grids). Similarly, embodiments apply to any identifiers, from which an assignment of the position within the grid in use can be derived.

Embodiments also apply to other types of picture partitioning means than grids. For example, in an embodiment, it may be indicated which adjacent grid cells in raster scan order are merged to form one cell in the identifier assignment. Such merging may be beneficial e.g. to reach shorter tile identifier codewords in slice headers.

In the above, where the example embodiments have been described with reference to an encoder, it needs to be understood that the resulting bitstream and the decoder may have corresponding elements in them. For example, as illustrated in FIG. 6, at block 60, a decoder may comprise means for receiving a picture, wherein the picture comprises one or more slices. As illustrated in block 62, the decoder may further comprise means for decoding, from a slice header of a slice, tile identifiers indicative of tile positions, the tile identifiers may be used for indicating slice location, for determining an anchor position for a motion vector, and/or for determining an anchor position for obtaining a motion vector candidate. As illustrated in block 64, the decoder may further comprise means for decoding an assignment of tile identifier value to tile positions in a parameter set file.

Similarly, as illustrated in FIG. 7, at block 70, a decoder may comprise means for receiving a bitstream comprising a coded picture, the coded picture comprising one or more tiles. As illustrated in block 72, the decoder may further include means for receiving an indication of an in-picture-prediction-enabled tile set, wherein the in-picture-prediction-enabled tile set identifies one or more dependent tiles from the one or more tiles, wherein the one or more dependent tiles are dependent on another dependent tile within a coded picture or form a logical atomic unit with another dependent tile. As illustrated in block 74, the decoder may further include means for decoding the bitstream according to the indication of the in-picture-prediction-enabled tile set.

Likewise, where the example embodiments have been described with reference to a decoder, it needs to be understood that the encoder may have structure and/or computer program for generating the bitstream to be decoded by the decoder.

In the above, where the example embodiments have been described with reference to syntax and semantics, it needs to be understood that the embodiments likewise cover an encoder that outputs a bitstream portion according to the syntax and semantics. Likewise, the embodiments likewise cover a decoder that decodes a bitstream portion according to the syntax and semantics.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an apparatus, it would be appreciated that the invention as defined in the claims may be implemented as part of any video codec. Thus, for example, embodiments of the invention may be implemented in a video codec which may implement video coding over fixed or wired communication paths.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that That which is claimed:

1. An apparatus comprising:
   at least one processor; and
   at least one non-transitory memory storing instructions that, when executed by the at least one processor, cause the apparatus at least to:
   receive a picture;
   encode the picture as one or more slices;
   encode, into a slice header of a slice of the one or more slices, a subpicture identifier indicative of a subpicture that comprises the slice; and
   encode a length of the subpicture identifier within a high level syntax structure;
   wherein the high level syntax structure comprises a picture parameter set or a sequence parameter set;
   wherein the subpicture identifier is indicative of a subpicture position for the subpicture comprising the slice, the subpicture identifier being among one or more subpicture identifiers indicative of one or more subpicture positions for one or more subpictures comprising one or more slices.

2. The apparatus of claim 1, wherein the instructions, when executed by the at least one processor, cause the apparatus at least to:
   encode, in or along a bitstream, one or more assignments of one or more subpicture identifier values for the one or more subpicture identifiers as a list of the one or more subpicture identifier values in raster scan order of the one or more subpictures;
   wherein the one or more assignments is encoded within a picture parameter set or a sequence parameter set.

3. The apparatus of claim 2, wherein the instructions, when executed by the at least one processor, cause the apparatus at least to:
   indicate, in or along a bitstream within a sequence parameter set or a picture parameter set, whether the one or more subpicture identifier values are assigned in a pre-defined manner or explicitly assigned in or along the bitstream.

4. The apparatus of claim 1, wherein the instructions, when executed by the at least one processor, cause the apparatus at least to:
   encode, in or along a bitstream, a reorder indication that indicates whether the one or more subpictures can be reordered without affecting decodability for the one or more subpictures as long as a modified ordering is explicitly provided.

5. An apparatus comprising:
   at least one processor; and
   at least one non-transitory memory storing instructions that, when executed by the at least one processor, cause the apparatus at least to:
   receive a coded picture;
   decode one or more slices from the coded picture;
   decode, from a slice header of a slice of the one or more slices, a subpicture identifier indicative of a subpicture that comprises the slice; and
   decode a length of the subpicture identifier from a high level syntax structure;
   wherein the high level syntax structure comprises a picture parameter set or a sequence parameter set;
   wherein the subpicture identifier is indicative of a subpicture position for the subpicture comprising the slice, the subpicture identifier being among one or more subpicture identifiers indicative of one or more subpicture positions for one or more subpictures comprising one or more slices.

6. The apparatus of claim 5, wherein the instructions, when executed by the at least one processor, cause the apparatus at least to:
   decode, from or along a bitstream, one or more assignments of one or more subpicture identifier values for the one or more subpicture identifiers from a list of the one or more subpicture identifier values in raster scan order of the one or more subpictures;
   wherein the one or more assignments are decoded from a picture parameter set or a sequence parameter set.

7. The apparatus of claim 6, wherein the instructions, when executed by the at least one processor, cause the apparatus at least to:
   decode, from or along a bitstream from a sequence parameter set or a picture parameter set, whether the one or more subpicture identifier values are assigned in a pre-defined manner or explicitly assigned in or along the bitstream.

8. The apparatus of claim 5, wherein the instructions, when executed by the at least one processor, cause the apparatus at least to:
   decode, from or along a bitstream, a reorder indication that indicates whether the one or more subpictures can be reordered without affecting decodability for the one or more subpictures as long as a modified ordering is explicitly provided.

9. A method comprising:
   receiving a picture;
   encoding the picture as one or more slices;
   encoding, into a slice header of a slice of the one or more slices, a subpicture identifier indicative of a subpicture that comprises the slice; and
   encoding a length of the subpicture identifier within a high level syntax structure;
   wherein the high level syntax structure comprises a picture parameter set or a sequence parameter set;
   wherein the subpicture identifier is indicative of a subpicture position for the subpicture comprising the slice, the subpicture identifier being among one or more subpicture identifiers indicative of one or more subpicture positions for one or more subpictures comprising one or more slices.

10. The method of claim 9, further comprising:
    encoding, in or along a bitstream, one or more assignments of one or more subpicture identifier values for the one or more subpicture identifiers as a list of the one or more subpicture identifier values in raster scan order of the one or more subpictures;
    wherein the one or more assignments is encoded within a picture parameter set or a sequence parameter set.

11. The method of claim 10, further comprising:
    indicating, in or along a bitstream within a sequence parameter set or a picture parameter set, whether the one or more subpicture identifier values are assigned in a pre-defined manner or explicitly assigned in or along the bitstream.

12. The method of claim 9, further comprising:

encoding, in or along a bitstream, a reorder indication that indicates whether the one or more subpictures can be reordered without affecting decodability for the one or more subpictures as long as a modified ordering is explicitly provided.

13. A method comprising:

receiving a coded picture;

decoding one or more slices from the coded picture;

decoding, from a slice header of a slice of the one or more slices, a subpicture identifier indicative of a subpicture that comprises the slice; and decoding a length of the subpicture identifier from a high level syntax structure;

wherein the high level syntax structure comprises a picture parameter set or a sequence parameter set;

wherein the subpicture identifier is indicative of a subpicture position for the subpicture comprising the slice, the subpicture identifier being among one or more subpicture identifiers indicative of one or more subpicture positions for one or more subpictures comprising one or more slices.

14. The method of claim 13, further comprising:

decoding, from or along a bitstream, one or more assignments of one or more subpicture identifier values for the one or more subpicture identifiers from a list of the one or more subpicture identifier values in raster scan order of the one or more subpictures;

wherein the one or more assignments are decoded from a picture parameter set or a sequence parameter set.

15. The method of claim 14, further comprising:

decoding, from or along a bitstream from a sequence parameter set or a picture parameter set, whether the one or more subpicture identifier values are assigned in a pre-defined manner or explicitly assigned in or along the bitstream.

16. The method of claim 13, further comprising:

decoding, from or along a bitstream, a reorder indication that indicates whether the one or more subpictures can be reordered without affecting decodability for the one or more subpictures as long as a modified ordering is explicitly provided.

* * * * *